United States Patent
Sun et al.

(10) Patent No.: US 12,389,427 B2
(45) Date of Patent: Aug. 12, 2025

(54) MULTI TRP BASED SCHEDULING OF MIXED TYPE TRAFFICS

(71) Applicant: Telefonaktiebolaget LM Ericsson (publ), Stockholm (SE)

(72) Inventors: Ying Sun, Täby (SE); Yutao Sui, Solna (SE); Mattias Frenne, Uppsala (SE); Mattias Andersson, Sundbyberg (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 404 days.

(21) Appl. No.: 17/910,367

(22) PCT Filed: Mar. 12, 2021

(86) PCT No.: PCT/SE2021/050222
§ 371 (c)(1),
(2) Date: Sep. 9, 2022

(87) PCT Pub. No.: WO2021/183036
PCT Pub. Date: Sep. 16, 2021

(65) Prior Publication Data
US 2023/0125598 A1    Apr. 27, 2023

Related U.S. Application Data

(60) Provisional application No. 62/989,357, filed on Mar. 13, 2020.

(51) Int. Cl.
*H04B 7/024* (2017.01)
*H04W 72/12* (2023.01)
(Continued)

(52) U.S. Cl.
CPC .......... *H04W 72/232* (2023.01); *H04B 7/024* (2013.01); *H04W 72/12* (2013.01); *H04W 72/543* (2023.01)

(58) Field of Classification Search
CPC .......... H04W 72/232; H04W 72/543
(Continued)

(56) References Cited

U.S. PATENT DOCUMENTS

2020/0008216 A1    1/2020  Iyer et al.
2020/0014510 A1*   1/2020  Wu ............... H04L 5/0092

FOREIGN PATENT DOCUMENTS

WO    2018228487 A1    12/2018

OTHER PUBLICATIONS

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.
(Continued)

*Primary Examiner* — Angel T Brockman
(74) *Attorney, Agent, or Firm* — Sage Patent Group

(57) ABSTRACT

Methods for scheduling mixed type traffics via multiple Transmission/Reception Points (TRPs) are provided. In embodiments disclosed herein, a base station provides, and a wireless device receives, a scheduling information for scheduling the mixed type traffics with different Quality of Service (QoS) requirements via multiple TRPs. In a non-limiting example, the mixed type traffics include an enhanced Mobile Broadband (eMBB) service and an Ultra-Reliable and Low Latency Communication (URLLC) traffic service, and the scheduling information can be conveyed in a single Downlink Control Information (DCI) or a pair of DCIs. As such, it is possible to enable efficient scheduling of both eMBB traffic and URLLC traffics simultaneously. As a result, it is possible to satisfy a reliability requirement of the URLLC service without sacrificing spectral efficiency and/or throughput of the eMBB service.

14 Claims, 20 Drawing Sheets

(51) Int. Cl.
*H04W 72/232* (2023.01)
*H04W 72/543* (2023.01)

(58) Field of Classification Search
USPC .......................................................... 370/329
See application file for complete search history.

(56) References Cited

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.
Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
International Search Report and Written Opinion for International Patent Application No. PCT/SE2021/050222, mailed Jun. 21, 2021, 13 pages.

\* cited by examiner

SCHEDULE A FIRST OF MULTIPLE TRPs TO TRANSMIT A MIXTURE OF A FIRST TYPE TRAFFIC (E.G., eMMB) CORRESPONDING TO A FIRST SET OF QoS REQUIREMENTS (E.G., HIGHER THROUGHPUT, MODERATE LATENCY, AND MODERATE RELIABILITY) AND A SECOND TYPE TRAFFIC (E.G., URLLC) CORRESPONDING TO A SECOND SET OF QoS REQUIREMENTS (E.G., LOWER LATENCY, HIGHER RELIABILITY, AND MODERATE THROUGHPUT) DIFFERENT FROM THE FIRST OF QoS REQUIREMENTS
900

SCHEDULE A SECOND OF THE MULTIPLE TRPs TO TRANSMIT AT LEAST THE SECOND TYPE TRAFFIC
902

*FIG. 9*

RECEIVE FROM A FIRST OF MULTIPLE TRPs A MIXTURE OF A FIRST TYPE TRAFFIC (E.G., eMMB) CORRESPONDING TO A FIRST SET OF QoS REQUIREMENTS (E.G., HIGHER THROUGHPUT, MODERATE LATENCY, AND MODERATE RELIABILITY) AND A SECOND TYPE TRAFFIC (E.G., URLLC) CORRESPONDING TO A SECOND SET OF QoS REQUIREMENTS (E.G., LOWER LATENCY, HIGHER RELIABILITY, AND MODERATE THROUGHPUT) DIFFERENT FROM THE FIRST OF QoS REQUIREMENTS
1000

RECEIVE FROM A SECOND OF THE MULTIPLE TRPs AT LEAST THE SECOND TYPE TRAFFIC
1002

*FIG. 10*

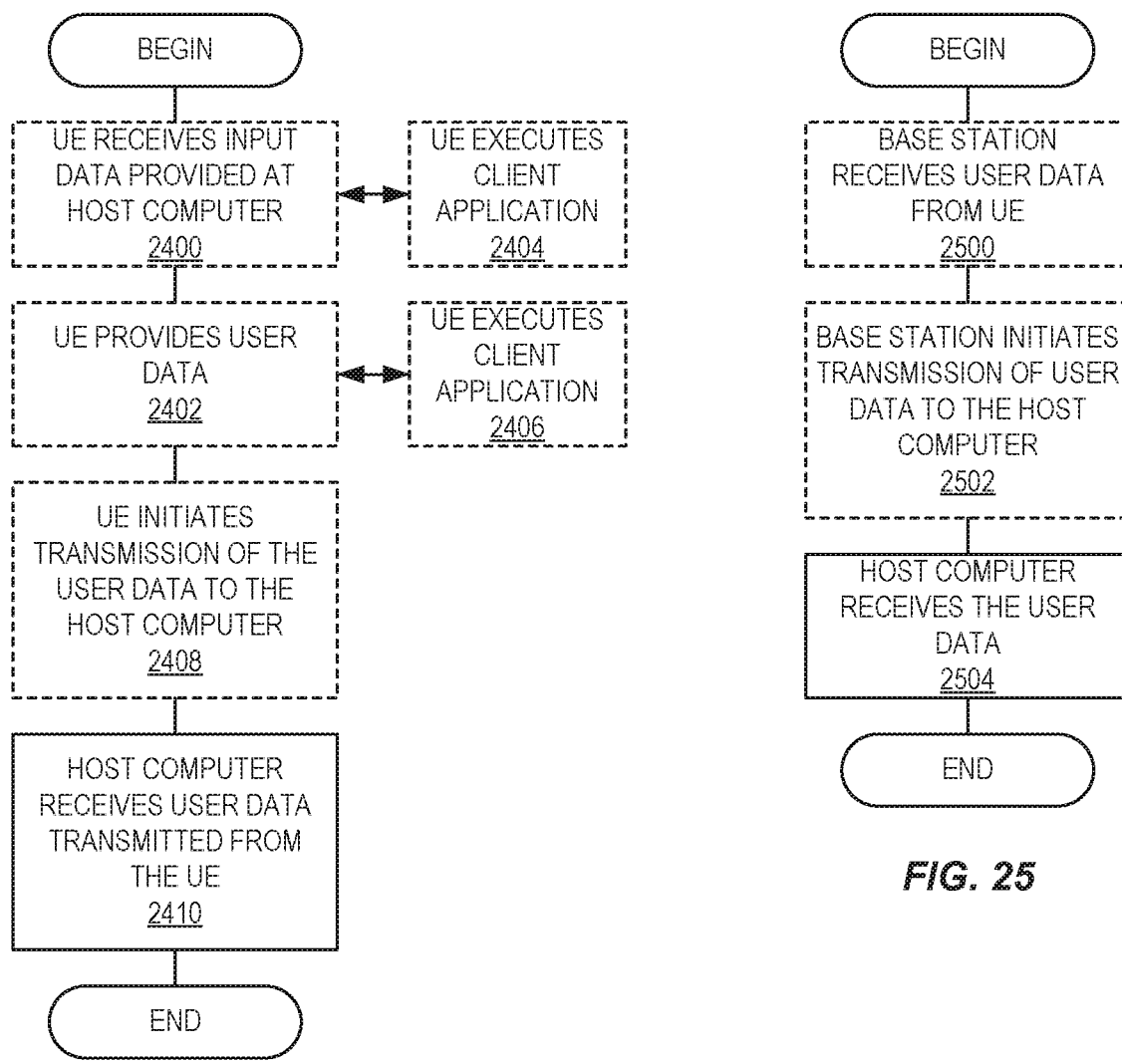

MULTI TRP BASED SCHEDULING OF MIXED TYPE TRAFFICS

RELATED APPLICATIONS

This application is a 35 U.S.C. § 371 national phase filing of International Application No. PCT/SE2021/050222, filed Mar. 12, 2021, which claims the benefit of provisional patent application Ser. No. 62/989,357, filed Mar. 13, 2020, the disclosures of which are hereby incorporated herein by reference in their entireties.

TECHNICAL FIELD

The technology of the disclosure relates generally to scheduling mixed type traffics via multiple Transmission/Reception Points (TRPs).

BACKGROUND

New Radio (NR) standard in 3GPP is being designed to provide service for multiple use cases, such as enhanced Mobile Broadband (eMBB), Ultra-Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is to reduce transmission time intervals. Thus, in addition to transmission in a slot, a mini-slot transmission is also allowed in NR to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for eMBB, URLLC, or other services. In this regard, FIG. 1 provides an exemplary illustration of a radio resource in NR.

Quality of Service (QoS) Requirement in 5G NR

In the 5G NR system, the lowest level granularity, where policy and charging are imposed, is a QoS flow. In 5G NR, QoS is imposed at the QoS flow level. Service Data Flows (SDFs) that share same policy and charging rules can be transported in the same QoS flow. All traffic within the same QoS flow has the same treatment. 3GPP TS 23.501 V16.3.0 specifies the following:

5.7.1.1 QoS Flow

The 5G QoS model is based on QoS Flows. The 5G QoS model supports both QoS Flows that require Guaranteed Bit Rate (GBR QoS Flows) and QoS Flows that do not require GBR (Non-GBR QoS Flows). The 5G QoS model also supports Reflective QoS (see clause 5.7.5).

5.7.2.1 5G QoS Identifier (5QI)

A 5QI is a scalar that is used as a reference to 5G QoS characteristics defined in clause 5.7.4, i.e., access node-specific parameters that control QoS forwarding treatment for the QoS Flow (e.g., scheduling weights, admission thresholds, queue management thresholds, link layer protocol configuration, etc.). Standardized 5QI values have one-to-one mapping to a standardized combination of 5G QoS characteristics as specified in Table 5.7.4-1 below in Section 5.7 of 3GPP TS 23.501 V16.3.0. For 5QI value 85, a package delay budget of 5 ms is required with a package error rate of $10^{-5}$. A static value for the CN PDB of 2 ms for the delay between a UPF terminating N6 and a 5G-AN should be subtracted from a given PDB to derive the packet delay budget that applies to the radio interface. This the most challenging QoS requirement in the current spec, which requires both very low latency and low error rate. In order to fulfill the overall package delay budget of 5 ms requirement, a delay budget of 3 ms is needed at the radio interface. It is foreseeable that more demanding QoS requirements will be introduced in the near future to support more demanding URLLC services, e.g., automatic driving cars or drones, smart manufacturing.

More information about QoS is given in Section 5.7 of TS 23.501 V16.3.0.

In Rel-16, various downlink multi-TRP (multiple Transmission/Reception Points) URLLC schemes are specified as part of NR Release-16 enhanced Multiple Input Multiple Output (eMIMO). The basic principle of increasing the reliability and robustness of a transmitted data packet, from a multi-TRP perspective, is to transmit multiple copies of the same data payload so that the UE can combine them. Here the multiple copies can be the exactly the same, or different redundancy versions of the same TB. Each transmission is associated with a different TRP, or to be more specific a different Transmission Configuration Indication (TCI) state in NR specification terminology. FIG. 2 illustrates the scheme. In Rel16, the multiple copies may be transmitted in different resources in time, frequency or spatial domain.

SUMMARY

Embodiments disclosed herein include methods for scheduling mixed type traffics via multiple Transmission/Reception Points (TRPs). In embodiments disclosed herein, a base station provides, and a wireless device receives, a scheduling information for scheduling the mixed type traffics with different Quality of Service (QoS) requirements via multiple TRPs. In a non-limiting example, the mixed type traffics include an enhanced Mobile Broadband (eMBB) service and an Ultra-Reliable and Low Latency Communication (URLLC) traffic service, and the scheduling information can be conveyed in a single Downlink Control Information (DCI) or a pair of DCIs. As such, it is possible to enable efficient scheduling of both eMBB traffic and URLLC traffics simultaneously. As a result, it is possible to satisfy a reliability requirement of the URLLC service without sacrificing spectral efficiency and/or throughput of the eMBB service. In addition, soft combining of URLLC data from different TRPs may also be achieved to further enhance the reliability of the URLLC service.

In one embodiment, a method performed by a wireless device for receiving mixed type traffics from a base station via multiple TRPs is provided. The method includes receiving, from one or more of the multiple TRPs, at least one DCI comprising a scheduling information for receiving a first type traffic and a second type traffic from the multiple TRPs. The method also includes receiving the first type traffic and the second type traffic from the multiple TRPs based on the scheduling information received in the at least one DCI.

In another embodiment, the first type traffic corresponds to a first set of QoS requirements; and the second type traffic corresponds to a second set of QoS requirements different from the first set of QoS requirements.

In another embodiment, the first set of QoS requirements comprises a Block Error Rate, BLER, target for the first type traffic; and the second set of QoS requirements comprises a BLER target for the second type traffic.

In another embodiment, the first type traffic is different from the second type traffic.

In another embodiment, the first type traffic is an eMBB traffic and the second type traffic is an URLLC traffic.

In another embodiment, the first set of QoS requirements correspond to a first of the multiple TRPs; and the second of QoS requirements correspond to a second of the multiple TRPs.

In another embodiment, receiving the at least one DCI comprises receiving a first DCI and a second DCI from the one or more of the multiple TRPs. The first DCI comprises the scheduling information for receiving the first type traffic and the second type traffic from the first of the multiple TRPs via a first Transport Block, TB, in a first Physical Downlink Shared Channel, PDSCH. The second DCI comprises the scheduling information for receiving the second type traffic from the second of the multiple TRPs via a second TB in a second PDSCH. Receiving the first type traffic and the second type traffic comprises receiving the first type traffic and the second type traffic from the first of the multiple TRPs and the second of the multiple TRPs based on the scheduling information received in the first DCI and the second DCI.

In another embodiment, the second type traffic received from the first of the multiple TRPs and the second of the multiple TRPs each comprises an identical data packet associated with the second type traffic.

In another embodiment, receiving the at least one DCI comprises receiving a first DCI and a second DCI from the one or more of the multiple TRPs. The first DCI comprises the scheduling information for receiving the first type traffic and the second type traffic from the first of the multiple TRPs via a first TB in a first PDSCH. The second DCI comprises the scheduling information for receiving the first type traffic and the second type traffic from the second of the multiple TRPs via a second TB in a second PDSCH. Receiving the first type traffic and the second type traffic comprises receiving the first type traffic and the second type traffic from the first of the multiple TRPs and the second of the multiple TRPs based on the scheduling information received in the first DCI and the second DCI.

In another embodiment, the first type traffic and the second type traffic received from the first of the multiple TRPs and the second of the multiple TRPs each comprises a different data packet associated with the first type traffic and an identical data packet associated with the second type traffic.

In another embodiment, the first DCI is received in a first Control Resource Set, CORESET, with a first activated Transmission Configuration Information, TCI, corresponding to the first of the multiple TRPs and scheduling the first PDSCH; and the second DCI is received in a second CORESET with a second activated TCI corresponding to the second of the multiple TRPs and scheduling the second PDSCH.

In another embodiment, the first PDSCH and the second PDSCH are scheduled to be fully overlapped, partially overlapped, or non-overlapped.

In another embodiment, receiving the at least one DCI comprises receiving a first DCI and a second DCI from the one or more of the multiple TRPs. The first DCI comprises the scheduling information for receiving the first type traffic from the first of the multiple TRPs via a first TB in a first PDSCH. The second DCI comprises the scheduling information for receiving the second type traffic from the first of the multiple TRPs and the second of the multiple TRPs via a second TB in both the first PDSCH and a second PDSCH, respectively. Receiving the first type traffic and the second type traffic comprises receiving the first type traffic and the second type traffic from the first of the multiple TRPs and the second of the multiple TRPs based on the scheduling information received in the first DCI and the second DCI.

In another embodiment, the first type traffic is multiplexed with the second type traffic in the first PDSCH based on one of: a spatial-division multiplexing scheme, a time-division multiplexing scheme, and a frequency-division multiplexing scheme.

In another embodiment, receiving the at least one DCI comprises receiving a single DCI from the one or more of the multiple TRPs, wherein the single DCI comprises the scheduling information for receiving each of the first type traffic and the second type traffic from the first of the multiple TRPs and the second of the multiple TRPs; and receiving the first type traffic and the second type traffic comprises receiving the first type traffic and the second type of traffic from the first of the multiple TRPs and the second of the multiple TRPs based on the scheduling information received in the single DCI.

In another embodiment, the single DCI further comprises the scheduling information for receiving from the first of the multiple TRPs via a first TB in a first PDSCH and the scheduling information for receiving from the first of the multiple TRPs and the second of the multiple TRPs via a second TB in a second PDSCH.

In another embodiment, the single DCI further comprises the scheduling information for receiving from the second of the multiple TRPs via a third TB in a third PDSCH.

In another embodiment, receiving the at least one DCI comprises receiving a first DCI and a second DCI from the one or more of the multiple TRPs. The first DCI comprises the scheduling information for receiving the first type traffic from the first of the multiple TRPs via a first PDSCH. The second DCI comprises the scheduling information for receiving the second type traffic from the first of the multiple TRPs and the second of the multiple TRPs via a second PDSCH and/or a third PDSCH, respectively. Receiving the first type traffic and the second type traffic comprises receiving the first type traffic and the second type traffic from the first of the multiple TRPs and the second of the multiple TRPs based on the scheduling information received in the first DCI and the second DCI.

In another embodiment, a wireless device is provided. The wireless device includes processing circuitry configured to cause the wireless device to receive, from one or more of multiple TRPs, at least one DCI comprising a scheduling information for receiving a first type traffic and a second type traffic from the multiple TRPs; and receive the first type traffic and the second type traffic from the multiple TRPs based on the scheduling information received in the at least one DCI. The wireless device also includes power supply circuitry configured to supply power to the wireless device.

In another embodiment, the processing circuitry is further configured to cause the wireless device to perform any of the steps of any of the embodiments performed by the wireless device.

In another embodiment, a method performed by a base station for transmitting mixed type traffics to a wireless device via multiple TRPs is provided. The method includes transmitting, to a wireless device via one or more of the multiple TRPs, at least one DCI comprising a scheduling information for transmitting a first type traffic and a second type traffic from the multiple TRPs. The method also includes transmitting the first type traffic and the second type traffic from the multiple TRPs based on the scheduling information transmitted in the at least one DCI.

In another embodiment, the first type traffic corresponds to a first set of QoS requirements; and the second type traffic corresponds to a second set of QoS requirements different from the first set of QoS requirements.

In another embodiment, the first set of QoS requirements comprises a Block Error Rate, BLER, target for the first type traffic; and the second set of QoS requirements comprises a BLER target for the second type traffic.

In another embodiment, the first type traffic is different from the second type traffic.

In another embodiment, the first type traffic is an eMBB traffic and the second type traffic is an URLLC traffic.

In another embodiment, the first set of QoS requirements correspond to a first of the multiple TRPs; and the second of QoS requirements correspond to a second of the multiple TRPs.

In another embodiment, transmitting the at least one DCI comprises transmitting a first DCI and a second DCI from the one or more of the multiple TRPs. The first DCI comprises the scheduling information for transmitting the first type traffic and the second type traffic from the first of the multiple TRPs via a first TB in a first PDSCH. The second DCI comprises the scheduling information for transmitting the second type traffic from the second of the multiple TRPs via a second TB in a second PDSCH. Transmitting the first type traffic and the second type traffic comprises transmitting the first type traffic and the second type traffic from the first of the multiple TRPs and the second of the multiple TRPs based on the scheduling information transmitted in the first DCI and the second DCI.

In another embodiment, the second type traffic received from the first of the multiple TRPs and the second of the multiple TRPs each comprises an identical data packet associated with the second type traffic.

In another embodiment, transmitting the at least one DCI comprises transmitting a first DCI and a second DCI from the one or more of the multiple TRPs. The first DCI comprises the scheduling information for transmitting the first type traffic and the second type traffic from the first of the multiple TRPs via a first TB in a first PDSCH. The second DCI comprises the scheduling information for transmitting the first type traffic and the second type traffic from the second of the multiple TRPs via a second TB in a second PDSCH. Transmitting the first type traffic and the second type traffic comprises transmitting the first type traffic and the second type traffic from the first of the multiple TRPs and the second of the multiple TRPs based on the scheduling information transmitted in the first DCI and the second DCI.

In another embodiment, the first type traffic and the second type traffic transmitted from the first of the multiple TRPs and the second of the multiple TRPs comprise a different data packet associated with the first type traffic and an identical data packet associated with the second type traffic.

In another embodiment, the first DCI is received in a first CORESET with a first activated TCI corresponding to the first of the multiple TRPs and scheduling the first PDSCH; and the second DCI is received in a second CORESET with a second activated TCI corresponding to the second of the multiple TRPs and scheduling the second PDSCH.

In another embodiment, the first PDSCH and the second PDSCH are scheduled to be fully overlapped, partially overlapped, or non-overlapped.

In another embodiment, transmitting the at least one DCI comprises transmitting a first DCI and a second DCI from the one or more of the multiple TRPs. The first DCI comprises the scheduling information for transmitting the first type traffic from the first of the multiple TRPs via a first TB in a first PDSCH. The second DCI comprises the scheduling information for transmitting the second type traffic from the first of the multiple TRPs and the second of the multiple TRPs via a second TB in both the first PDSCH and a second PDSCH, respectively. Transmitting the first type traffic and the second type traffic comprises transmitting the first type traffic and the second type traffic from the first of the multiple TRPs and the second of the multiple TRPs based on the scheduling information transmitted in the first DCI and the second DCI.

In another embodiment, the first type traffic is multiplexed with the second type traffic in the first PDSCH based on one of: a spatial-division multiplexing scheme, a time-division multiplexing scheme, and a frequency-division multiplexing scheme.

In another embodiment, transmitting the at least one DCI comprises transmitting a single DCI from the one or more of the multiple TRPs, wherein the single DCI comprises the scheduling information for transmitting each of the first type traffic and the second type traffic from the first of the multiple TRPs and the second of the multiple TRPs; and transmitting the first type traffic and the second type traffic comprises transmitting the first type traffic and the second type traffic from the first of the multiple TRPs and the second of the multiple TRPs based on the scheduling information transmitted in the single DCI.

In another embodiment, the single DCI further comprises the scheduling information for transmitting from the first of the multiple TRPs via a first TB in a first PDSCH and the scheduling information for transmitting from the first of the multiple TRPs and the second of the multiple TRPs via a second TB in a second PDSCH.

In another embodiment, the single DCI further comprises the scheduling information for transmitting from the second of the multiple TRPs via a third TB in a third PDSCH.

In another embodiment, transmitting the at least one DCI comprises transmitting a first DCI and a second DCI from the one or more of the multiple TRPs. The first DCI comprises the scheduling information for transmitting the first type traffic from the first of the multiple TRPs via a first PDSCH. The second DCI comprises the scheduling information for transmitting the second type traffic from the first of the multiple TRPs and the second of the multiple TRPs via a second PDSCH and a third PDSCH, respectively. Transmitting the first type traffic and the second type traffic comprises transmitting the first type traffic and the second type traffic from the first of the multiple TRPs and the second of the multiple TRPs based on the scheduling information transmitted in the first DCI and the second DCI.

In another embodiment, a base station is provided. The base station includes processing circuitry configured to cause the base station to: transmit, to a wireless device via one or more of multiple TRPs, at least one DCI comprising a scheduling information for transmitting a first type traffic and a second type traffic from the multiple TRPs; and transmit the first type traffic and the second type traffic from the multiple TRPs based on the scheduling information transmitted in the at least one DCI. The base station also includes power supply circuitry configured to supply power to the base station.

In another embodiment, the processing circuitry is further configured to cause the base station to perform any of the steps of any of the embodiments performed by the base station.

In another embodiment, a method performed by a wireless device for receiving at least one DCI is provided. The method includes receiving a first DCI in a first CORESET associated with a first CORESET Pool Index. The method also includes receiving a second DCI in a second CORESET associated with a second CORESET Pool Index. The first DCI comprises a scheduling information for receiving a first TB in a first PDSCH. The second DCI comprises a second scheduling information for receiving a second TB in one or more PDSCHs according to a configured reliability scheme.

In another embodiment, the method also includes receiving the first TB and the second TB in accordance with the received first DCI and the second DCI, respectively.

In another embodiment, the scheduling information provided by the first DCI contains a single TCI state.

In another embodiment, the scheduling information provided by the second DCI contains two TCI states.

In another embodiment, the configured reliability scheme is one of FDMSchemeA, FDMSchemeB, or TDMSchemeA.

In another embodiment, the configured reliability scheme is a slot-based repetition scheme.

In another embodiment, a method performed by a base station for transmitting at least one DCI is provided. The method includes transmitting a first DCI in a first CORESET associated with a first CORESET Pool Index. The method also includes transmitting a second DCI in a second CORESET associated with a second CORESET Pool Index. The first DCI comprises a scheduling information for receiving a first, TB in a first PDSCH. The second DCI comprises a second scheduling information for receiving a second TB in one or more PDSCHs according to a configured reliability scheme.

In another embodiment, the method also includes transmitting the first TB and the second TB in accordance with the received first DCI and the second DCI, respectively.

In another embodiment, the scheduling information provided by the first DCI contains a single TCI state.

In another embodiment, the scheduling information provided by the second DCI contains two TCI states.

In another embodiment, the configured reliability scheme is one of FDMSchemeA, FDMSchemeB, or TDMSchemeA.

In another embodiment, the configured reliability scheme is a slot-based repetition scheme.

In another embodiment, a communication system is provided. The communication system includes a host computer. The host computer includes processing circuitry configured to provide user data. The host computer also includes a communication interface configured to forward user data to a cellular network for transmission to a User Equipment, UE. The UE comprises a radio interface and processing circuitry, the UE's components configured to perform any of the steps of any of the embodiments performed by the wireless device.

In another embodiment, a communication system is provided. The communication system includes a host computer. The host computer includes processing circuitry configured to provide user data. The host computer also includes a communication interface configured to forward the user data to a cellular network for transmission to a UE. The cellular network includes a base station having a radio interface and processing circuitry, the base station's processing circuitry configured to perform any of the steps of any of the embodiments performed by the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 is a flowchart of an exemplary method performed by a base station for scheduling mixed type traffics via multiple TRPs;

FIG. 10 is a flowchart of an exemplary method performed by a wireless device for receiving mixed type traffics via multiple TRPs;

FIG. 24 is a flowchart illustrating a method implemented in a communication system in accordance with one embodiment of the present disclosure; and FIG. 25 is a flowchart illustrating a method implemented in a communication system in accordance with one embodiment of the present disclosure.

DETAILED DESCRIPTION

Figure 1:
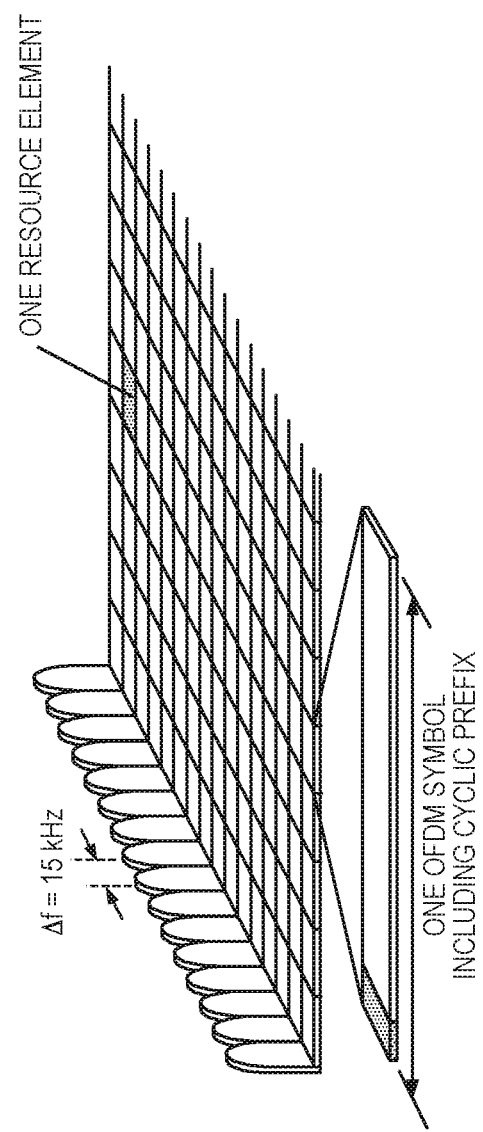
FIG. 1 provides an exemplary illustration of a radio resource in New Radio (NR)
Figure 2:
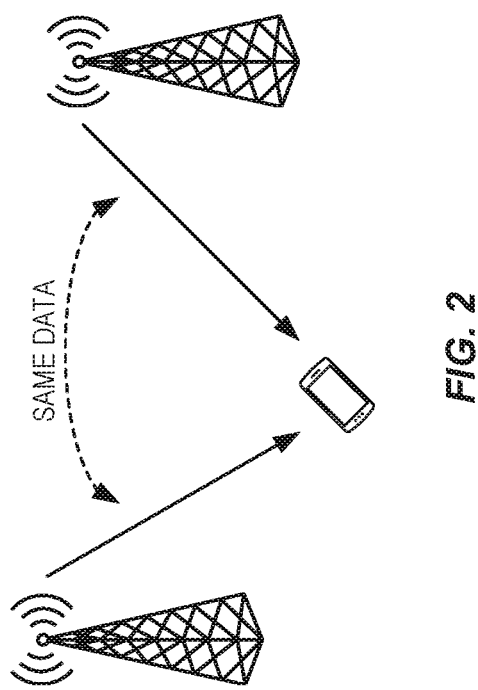
FIG. 2 illustrates the scheme of Rel16, wherein different transmissions can be done either in time, frequency or spatial domain.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The enhanced Mobile Broadband (eMBB) service has a relatively more relaxed latency requirement compared to Ultra-Reliable and Low Latency Communication (URLLC) service but requires much higher throughput than the URLLC service. In common use cases, both URLLC and eMBB must be operating in parallel for the UE. Therefore, when a URLLC data package arrives, the URLLC data package may need to be prioritized over an eMBB packet.

If eMBB and URLLC data are multiplexed (e.g., by concatenation of URLLC and eMBB data in the MAC layer) in the same Transport Block (TB), the URLLC reliably requirement (up to $10^{-6}$ Block Error Rate (BLER)) must be applied for the whole TB, i.e., both for the eMBB and URLLC data. Notably, increasing reliability with a given delay budget may reduce spectral efficiency. As such, when eMBB and ULRRC data are multiplex, it may lead to lower special efficiency for eMBB traffic. Typically, errors for eMBB may be corrected via Hybrid Automatic Repeat Request (HARQ) retransmissions, only $10^{-1}$ BLER is usually required for the initial transmission of eMBB, e.g., in the case when eMBB traffic is sent alone. For URLLC, due to low latency requirements, e.g., current 5QI value requires a 5 ms package delay budget, HARQ retransmission in the lower layer may not be possible. Therefore, lower BLER requirements by the ULRRC service have to be achieved by using robust link adaptation (e.g., low code rate) at a cost of more resources needed to transmit the same data package, which reduce the spectral efficiency to achieve the reliability requirement for the URLLC service. Therefore, it may be desirable to increase spectral efficiency when simultaneously multiplexing URLLC traffic with eMBB traffic to or from the same UE.

Certain aspects of the present disclosure and their embodiments may provide solutions to the aforementioned or other challenges. In embodiments disclosed herein, either a single Downlink Control Information (DCI) or multiple DCIs may be used to dynamically schedule mixed type traffic for a UE from different Transmission/Reception Points (TRPs). The scheduling decision may be based on several factors, including but not limited to Quality of Service (QoS) requirement, delay requirement, the UE buffer status, throughput requirement, and so on. Time, frequency, and/or spatial resources may also be allocated dynamically for the UE.

There are, proposed herein, various embodiments which address one or more of the issues disclosed herein.

In one aspect, a method performed by a base station for scheduling mixed type traffics via multiple TRPs is disclosed. The method includes scheduling a first of the multiple TRPs to transmit a mixture of a first type traffic (e.g., eMMB) corresponding to a first set of QoS requirements (e.g., higher throughput, moderate latency, and moderate reliability) and a second type traffic (e.g., URLLC) corresponding to a second set of QoS requirements (e.g., lower latency, higher reliability, and lower throughput) different from the first set of QoS requirements. The method also includes scheduling a second of the multiple TRPs to transmit at least the second type traffic.

In another aspect, a method performed by a wireless device for receiving mixed type traffics via multiple TRPs is disclosed. The method includes receiving from a first of the multiple TRPs a mixture of a first type traffic (e.g., eMMB) corresponding to a first set of QoS requirements (e.g., higher throughput, moderate latency, and moderate reliability) and a second type traffic (e.g., URLLC) corresponding to a second set of QoS requirements (e.g., lower latency, higher reliability, and lower throughput) different from the first set of QoS requirements. The method also includes receiving from a second of the multiple TRPs at least the second type traffic.

Certain embodiments may provide one or more of the following technical advantage(s). By utilizing the multi-TRP transmission scheme already standardized in Rel16, it may be possible to enable an efficient method for scheduling both eMBB traffic and URLLC traffic simultaneously. As a result, it may be possible to satisfy reliability requirement of the URLLC service without sacrificing spectral efficiency and/or throughput of eMBB service. In addition, soft combining of URLLC data from different TRPs may also be achieved to further enhance the reliability.

Figure 3:
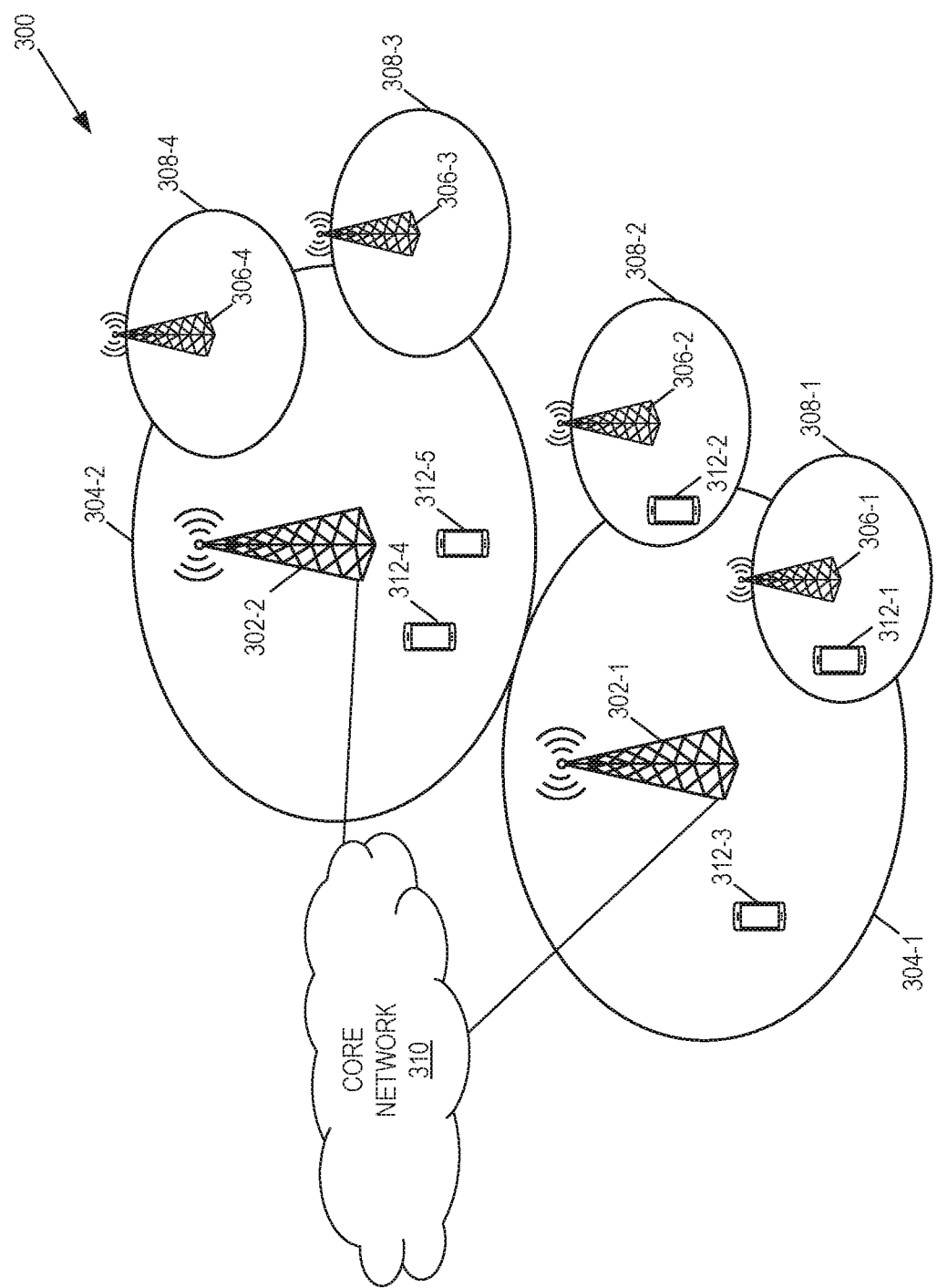
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G System (5GS) including a NR RAN. In this example, the RAN includes base stations 302-1 and 302-2, which in 5G NR are referred to as gNBs (e.g., LTE RAN nodes connected to 5G Core (5GC), which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G Core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

The 5G NR enables a range of use cases, such as enhanced mobile broadband (eMBB), massive machine type communications (mMTC), and ultra-reliable low latency communications (URLLC). Embodiments discussed herein are related to the eMBB and URLLC aspects of 5G. In practice, eMBB or URLLC services map to a set of different quality of service (QoS) requirements (e.g., delays, error rates, etc.). The name of eMBB and URLLC are examples of the services that have certain characters and should not be regarded as limitations. Before discussing specific embodiments of the present disclosure, a brief discussion of a theoretical background underlying the embodiments is first provided below.

Equation (Eq. 1) illustrates a relationship between Packet Error Rate requirement (PER) at an application layer and HARQ operating point (BLER target, α) and total number of duplication transmissions (N) based on an assumption of a high reliable level in the Core Network (CN) and Transport Network (TN) (e.g., the CN or TN do not induce packet error loss after the physical layer has correctly handled the packages).

$$f(\alpha^N) = PER \qquad (Eq.\ 1)$$

In the equation (Eq. 1) above, PER represents the packet error rate specified in QoS requirement of a specific service/application, α represents the link adaptation HARQ operating point (BLER target) of the first data transmission, and N represents the total number of independent duplication transmissions that are supported by Packet Delay Budget (PDB) of QoS requirement of the service, including both time and simultaneous duplication transmissions ($N_{time}$, $N_{sim}$).

According to the equation (Eq. 1) above, if a data package has a PER requirement of 1e-6, then it may be possible to choose the link adaptation parameters (e.g., modulation and/or code rate, radio resources, etc.) to send one package with BLER 1-e6). Alternatively, it may also be possible to send the same data package three times through independent (uncorrelated or low correlated) radio links with such link adaptation parameters resulting in a BLER target=1e-2 for each package. The combined package at the receiver will give a PER of 1e-6.

In embodiments discussed hereinafter, a data package may have a different meaning from a Transport Block (TB). A transport block is used to carry the data from Medium Access Control (MAC) layer to Physical (PHY) layer, and each TB block can have several different redundancy versions representing the same data package. When the UE receives multiple TBs from multiple TRPs (same or different redundancy versions), the UE may combine the TBs in the PHY layer and perform one decoding. This usually leads to additional gains to the diversity gain from independent radio paths (a.k.a. soft combining gain). However, it is also possible that the UE decodes each individual TB (e.g., if UE does not have enough processing power to perform the combining). This gives diversity gain from independent radio paths only.

In Rel-16, multi-TRP transmission is introduced. A serving cell configured to serve the UE has several different TRPs, and each of them can be used to transmit data over an independent data path (radio channel) to the UE. With multi-TRP transmissions, different copies of the same data or information, can be transmitted from different TRPs. Depending on specific implementations, either the same copies of the data can be transmitted from different TRPs or differently encoded redundancy versions of the same information can be transmitted from different TRPs. The UE can then use and/or combine the different copies to achieve the desired PER.

For URLLC service, it requires much lower latency and BLER compared to the eMBB service. The data package of URLLC service is also much smaller compared to that of the eMBB service. But time domain retransmissions in URLLC service are typically limited due to the tight PDB. Therefore, limited or no HARQ retransmission are possible for URLLC traffic. There are several alternatives to achieve the reliability requirement for URLLC within the PDB. For example, for the use case of PDB=0.5 ms or 1 ms, PER=1e-6, $N_{time}=1$, the following three alternatives can be used:

Alterative 1: single path transmission, Robust link adaptation, BLERtarget=PER=1e-6
Alterative 2: multiTRP transmissions Nsim=3, BLER=1e-2
Alternative 3: PDCP duplication Nsim=3, BLER=1e-2

Here, it is assumed that the PDB only allows $N_{time}=1$ transmission in the time domain. As such, either very quick link adaptation should be used from one TRP or multi-TRPs can be used with 3 copies of the same data, or higher layer Packet Data Convergence Protocol (PDCP)) duplication can be used.

However, some use cases may require mixed type traffics to be supported. For example, in a robot, video, audio connection and communication may require high throughput but can tolerate some errors. In contrast, signals for controlling the moving paths or complex series of actions of the robot may require low latency and high reliability. Therefore, mixed type traffics may be expected for the robot.

In Rel15 NR, when eMBB traffic is multiplexed with URLLC traffic in one TB, the URLLC requirement has to be applied to that transport block (as it is a stricter requirement). Otherwise, the eMBB service has to be scheduled separately in time or frequency from the URLLC traffic. However, by applying the URLLC requirement on the eMBB traffic, it may lead to a waste of resources and thus a lower throughput for the eMBB traffic. In Rel15 NR, URLLC services can reduce downlink latency by preempting eMBB transmissions. In other words, the URLLC can interrupt an ongoing eMBB transmission by stealing the resource allocated to the eMBB traffic. A preemption indicator can be used to notify the UE about the URLLC stealing, and retransmission for the interrupted eMBB traffic can be rescheduled at a later time. In this regard, the solution in Rel15 may fulfill reliability and latency requirements of the URLLC service at an expense of spectral efficiency and throughput of the eMBB service.

In a non-limiting example, it may be possible to overcome or mitigate the above-identified shortcomings in Rel15 based on a standardized multi-TRP feature in Rel-16 NR. Specifically, if a mixed type of eMBB and URLLC traffic is present, it may be possible to schedule the eMBB and URLLC traffic simultaneously and assign time and/or frequency resource from different TRPs to meet respective QoS requirements of the eMBB and URLLC services. Specific embodiments of the present disclosure are now discussed below.

Embodiment 1 (e.g., 1100, 1102, 1200, 1202)

Figure 4:
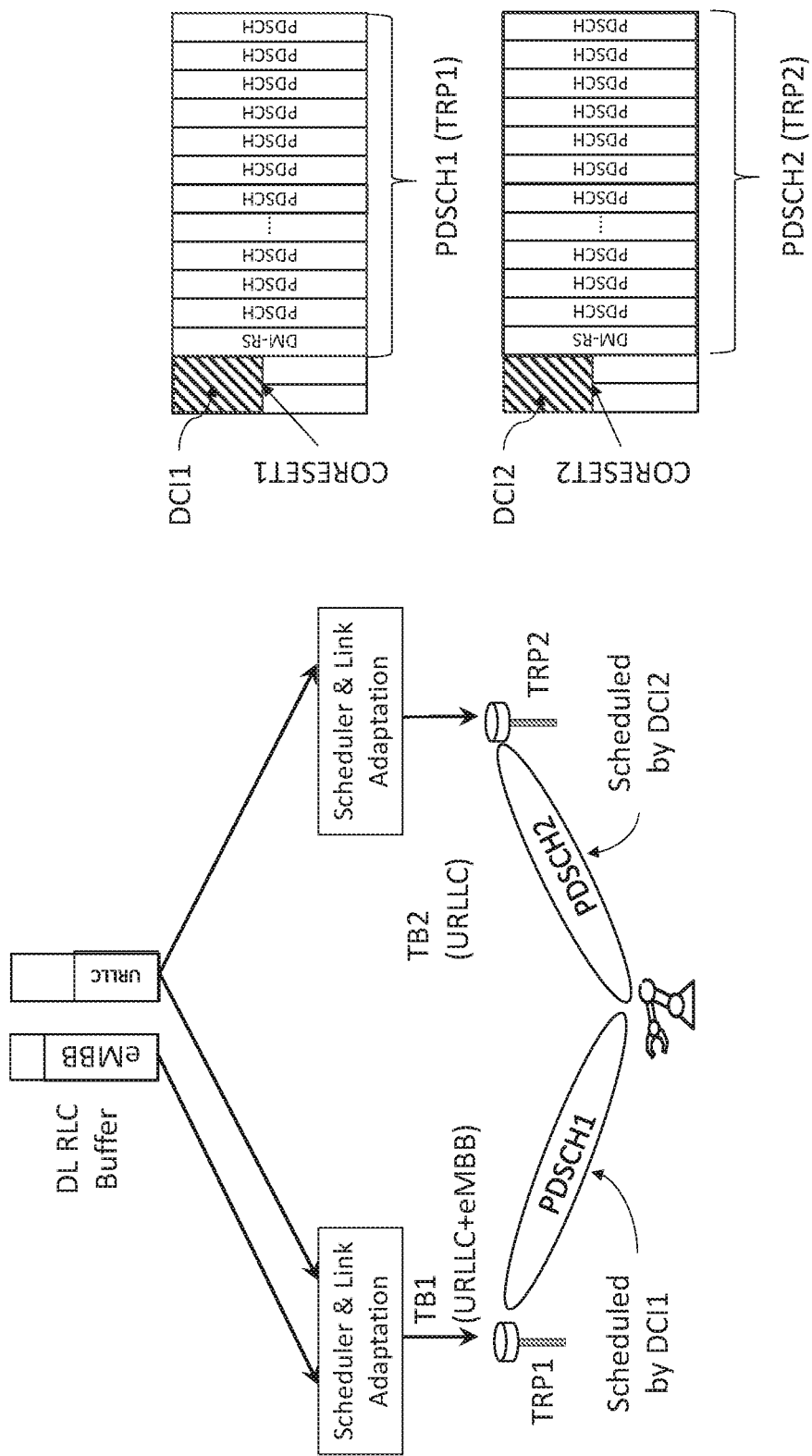
FIG. 4 is a schematic diagram wherein Ultra-Reliable and Low Latency Communication (URLLC) data may be duplicated to more than one Transmission/Reception Point (TRP) when a User Equipment (UE) needs to receive a mixture of enhanced Mobile Broadband (eMBB) and URLLC traffic simultaneously.

As illustrated in FIG. 4 (e.g., 1100-1, 1102-1, 1200-1, 1202-1), when a UE needs to receive a mixture of eMBB and URLLC traffic simultaneously, the URLLC data may be duplicated to more than one TRP. In FIG. 4, two TRPs are shown as a non-limiting example. However, it should be appreciated that additional TRPs can be used depending on availability of the additional TRPs, the UE's ability to support the additional TRPs, and other related factors.

The first URLLC is multiplexed with eMBB service and sent in TB1. The TB1 is scheduled by a DCI (downlink control information) carried by PDCCH, which is transmitted on Control Resource Set (CORESET) associated with TRP1 (e.g., through a TCI state configured for that CORESET). Also, the CORESET may have a respective Rel.16 CORESET pool index=0 configured, which effectively implies "TRP1." The duplicated URLLC data packet is sent from TRP2 in TB2.

TB2 is scheduled by a DCI (downlink control information) carried by PDCCH (or CORSET) associate with TRP2, through a different TCI state than CORESET for TRP1. Also, the CORESET may have a respective Rel.16 CORESET pool index=1 configured, indicating "TRP2" to the UE. Note that the TCI states associated with each scheduled PDSCH can also be independently indicated by the TCI field present in DCI1 and DCI2.

The coding and modulation scheme as well as the resource allocation for TB1 and TB2 are independently controlled by respective DCIs based on some QoS requirement. For TB1, the parameters (typically results in higher data rate or code rate) can be set to achieve a balance between the eMBB throughput and the URLLC reliability. This means TB1 does not have to use as robust link adaptation according to a single URLLC transmission. TB2 from TRP2 can then be adjusted according to the parameters used by TB1 to send the URLLC data to achieve the desired overall URLLC reliability. But in general, the time and/or frequency resources used by TB2 are still less than the robust link adaptation according to a single URLLC transmission, as one copy of the same URLLC data packet is sent in TRP1.

Figure 5:
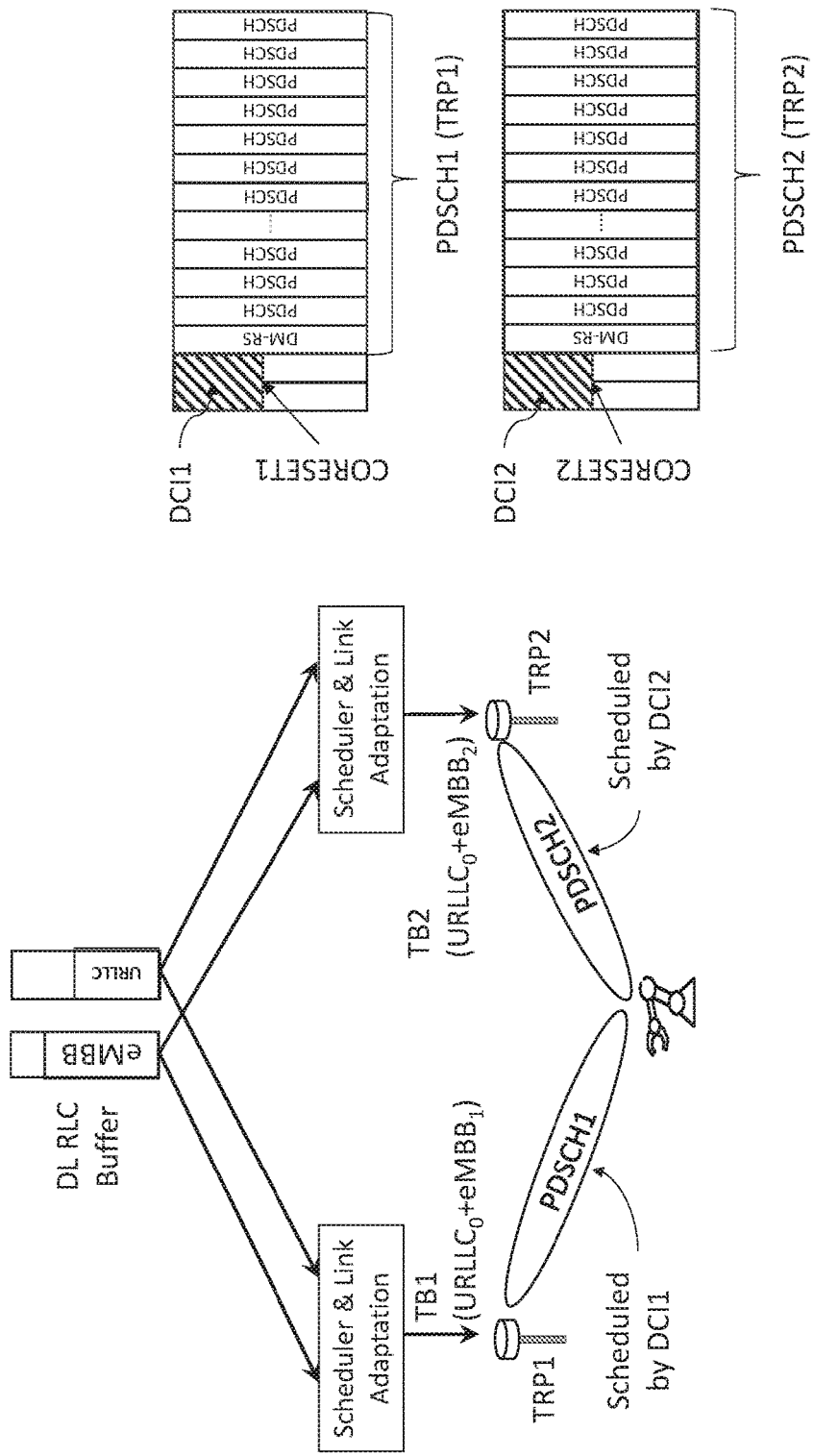
FIG. 5 illustrates an alternative implementation to the implementation illustrated in FIG. 4.

FIG. 5 (e.g., 1100-2, 1102-2, 1200-2, 1202-2) illustrates an alternative implementation to the implementation illustrated in FIG. 4. In this example, a first eMBB data packet eMBB1 is multiplexed with a URLLC data packet URLLC0 in the same TB (denoted by TB1) transmitted on PDSCH1. PDSCH1 is scheduled by DCI1 carried by a PDCCH transmitted on CORESET 1, which is associated with TRP1 (e.g., through a TCI state configured for that CORESET). The UE also receives PDSCH2 which contains a TB (denoted by TB2), in which a second eMBB data packet eMBB2 is multiplexed with the same URLLC data packet URLLC0. PDSCH2 is scheduled by DCI2 carried by a PDCCH transmitted on CORESET 2, which is associated with TRP2 (e.g., through a TCI state configured for that CORESET). Since the same URLLC data packet URLLC0 is multiplexed into both TB1 and TB2, URLLC reliability can be ensured. At the same time, different eMBB data packets are multiplexed into TB1 and TB2, which may further improve the eMBB throughput compared to the implementation illustrated in FIG. 4. Note that in both FIGS. 4 and 5, the URLLC data packet can be successfully received by the UE as long as the decoding of one of TB1 and TB2 is successful.

As URLLC data is scheduled together with eMBB at the same time, the eMBB traffic no longer needs to be pre-empted (as what has to be done in Rel-15). And due to different independent paths that are used, less time/frequency resources are consumed.

Notice that both FIGS. 4 and 5 are used for illustration purposes. The transmissions from the TRPs do not need to be exactly time aligned. For example, as long as the delay constraint for URLLC can be fulfilled, the scheduling and transmission of TB2 can start sometimes later than TB1 or vice versa. Or as long as the delay constraint can be fulfilled, TB2 can be sent after the UE receives TB1 for UEs with less processing capability or vice versa.

In one embodiment, when CORESETs in a serving cell are configured with two values of Rel-16 CORESET pool index (e.g., some CORESETs are configured with CORESET pool index 0 while some other CORESETs are configured with CORESET pool index 1), PDSCH1 and PDSCH2 in FIGS. 4 and 5 can be scheduled to fully or partially overlap in time-domain. In this case, TB2 can be scheduled before the UE has completed receiving TB1. Note that PDSCH1 and PDSCH2 can also be non-overlapping in time-domain in this embodiment. In summary, there is no scheduling restriction for the two PDSCHs scheduled as long as the two PDSCHs are scheduled from CORESETs in different CORESET pools.

In a second embodiment, when CORESETs in a serving cell are configured with only one value of Rel-16 CORESET pool index (e.g., CORESETs are configured with CORESET pool index 0) or when Rel-16 CORESET pool index is not configured to the CORESETs in a serving cell, PDSCH1 and PDSCH2 in FIGS. 4 and 5 need to be non-overlapping in time-domain (partial or full overlapping in time-domain is not allowed). In this embodiment, scheduling of the two PDSCHs are restricted such that PDSCH2 can only be received after the UE has finished receiving PDSCH1.

Embodiment 2 (e.g., 1100, 1102, 1200, 1202, 1300, 1302, 1400, 1402)

In Rel-16 NR, a single DCI (single PDCCH) can be used to schedule transmission from different TRPs to reduce the scheduling overhead with the constraint that the same TB has to be transmitted from the different TRPs (it can be different redundancy versions of the TB). Furthermore, in Rel-16 NR, a multi-DCI functionally is supported for multi-TRP transmission. That is, the UE can receive multiple DCIs at the same time, and different DCIs schedule different TBs. The multiple DCIs can be from the same TRP or different TRPs (e.g., through configuring different TCI states for different CORESETs).

Figure 6:
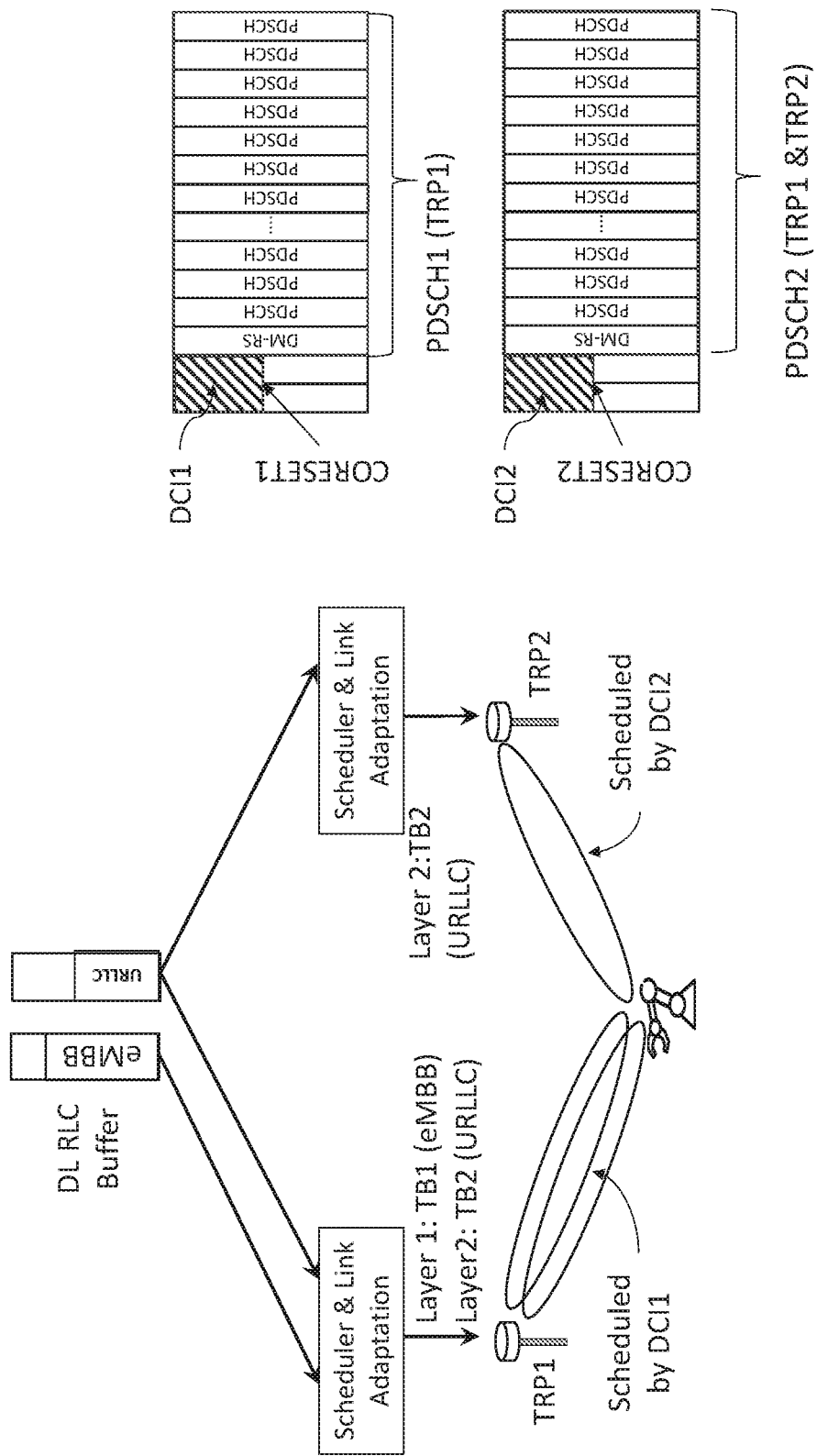
FIG. 6 is a schematic diagram wherein a first Downlink Control Information (DCI1) is used to schedule the eMBB data from a first TRP (TRP1) and a second DCI (DCI2) is used to schedule URLLC data both for TRP1 and a second TRP (TRP2) based on one of the URLLC schemes defined in NR Rel.16.

As illustrated in FIG. 6 (e.g., 1100-2, 1102-3, 1200-3, 1202-3), DCI1 is used to schedule the eMBB data from TRP1, and DCI2 is used to schedule URLLC data both for TRP1 and TRP2 based on one of the URLLC schemes defined in NR Rel.16 (e.g., the configured reliability schemes FDMSchemeA, FDMSchemeB, TDMScheme A, or TDM scheme B) as listed below:

FDMSchemeA, transmits one PDSCH in a slot and in the same set of OFDM symbols, where each resource block (RB) is associated with one of two indicated TCI states, for example with TRP1 or TRP2, respectively.

FDMSchemeB, transmits two PDSCHs in a slot and in the same set of OFDM symbols, where each resource block is associated with one of two indicated TCI states, for example with TRP1 or TRP2, respectively and all the RB associated with the same TCI state defines one PDSCH. Since two PDSCHs are used, the redundancy version can be different among the two PDSCHs to further increase reliability. Each PDSCH transmits the same information but potentially with different encoding (redundancy versions).

TDMSchemeA, transmits two PDSCHs but in two sets of non-overlapping OFDM symbols. Each PDSCH transmits the same information but potentially with different encoding (redundancy versions). PDSCH 1 and 2 are transmitted from TRP 1 and 2 respectively (e.g., associated with TCI state 1 and 2).

TDMSchemeB, known as slot repetition, transmits up to 16 PDSCHs, one per slot. Each PDSCH transmits the same information but potentially with different encoding (redundancy versions). PDSCHs are transmitted alternating from TRP 1 and 2 (e.g., associated with TCI state 1 and 2, in a specified pattern).

Since the URLLC scheme is configured per serving cell, the URLLC scheme applies also for scheduling from TRP1, for a given UE, if configured to be applied from TRP2. However, Rel.16 has a fallback mode, so one can always fall back to eMBB transmission (single TRP, no repetition). In this case, the DCI from TRP1 will use the fallback, while the DCI from TRP2 will not use the fallback, but the configured URLLC scheme.

In this way, the eMBB data can be scheduled at the same time with URLLC data but the parameters of TB1 and TB2 are set independently. The parameters configured and activated for the scheduling of TB2, for example, can involve a number of repetitions and/or frequency domain resource allocation for both TRP1 and TRP2. In this regard, the parameter of TB2 can meet the QoS requirement of the URLLC service. In contrast, the parameter of TB1 is decided based on the QoS requirement of the eMBB service for single TRP and without repetition.

In this example, the eMBB data from TRP1 is scheduled on a different spatial layer from where the URLLC data from TRP1 was scheduled. It can also be possible that the eMBB and the URLLC are scheduled from different frequency or time resources as the URLLC schemes explained above. Also, the length of the transmission of the PDSCH carrying eMBB and TRP does not need to be the same, and the PDSCH carrying eMBB and TRP can have different starting times. In other words, the scheduling of eMBB has full flexibility, as long as the required QoS service requirement is fulfilled.

One advantage of this solution is that the DCI used to schedule different services are independent, which means more robust DCI (e.g., different DCI formats or lower code rate or higher aggregation levels) can be used for the scheduling of URLLC services. Also, the HARQ retransmission of the eMBB service is also independent from URLLC.

Moreover, in Rel.17, PDCCH repetition is likely to be introduced, where DCI is repeated across two TRPs. In this case, DCI repetition scheme may be used for TRP2 scheduling (at the cost of control channel overhead) to improve reliability. Nevertheless, the DCI repetition scheme will not be used for TRP1 since repetition is not needed for eMBB services.

Embodiment 3 (e.g., 1100, 1102, 1200, 1202)

Figure 7:
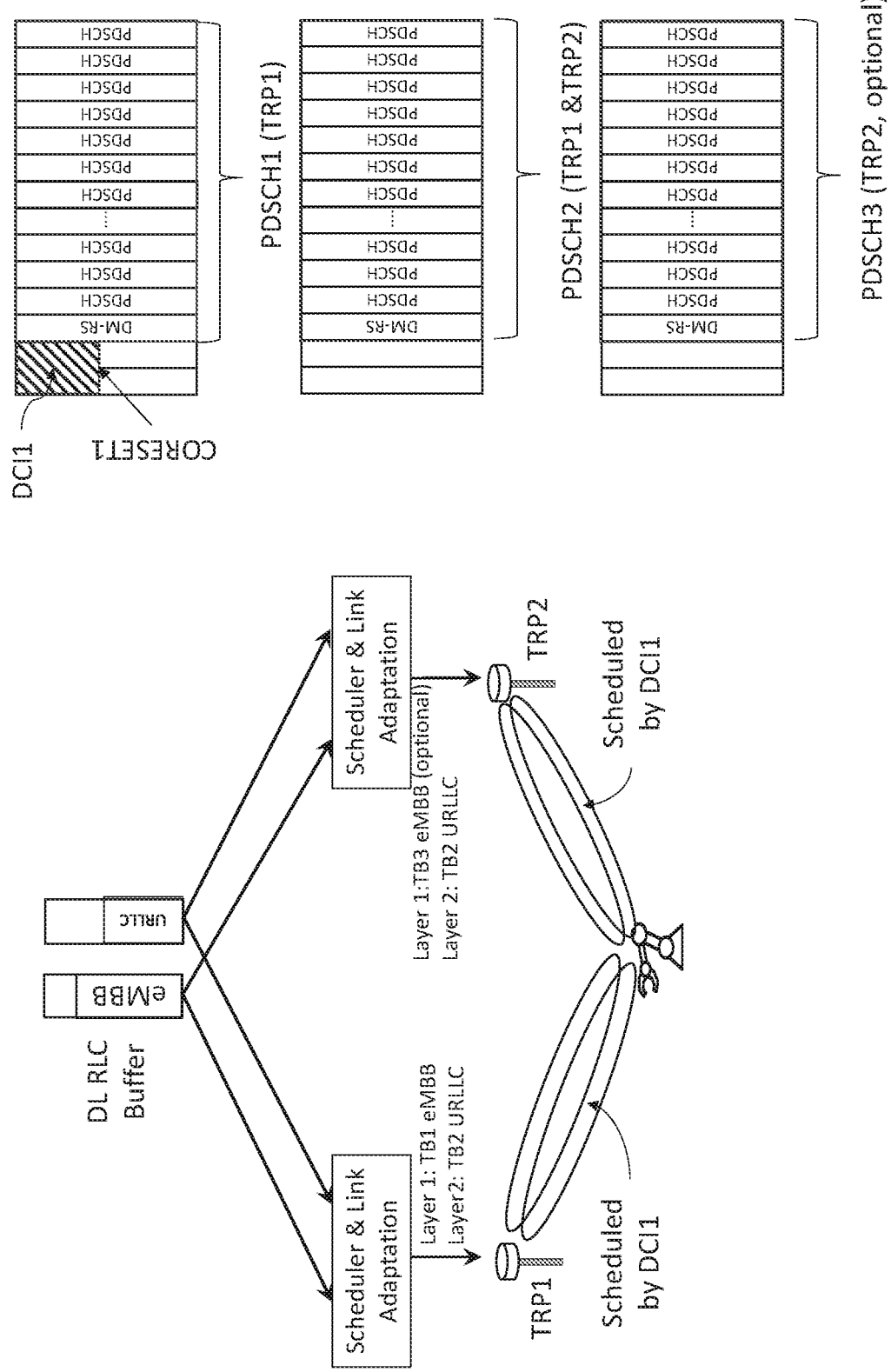
FIG. 7 is a schematic diagram wherein a single DCI is used to schedule both eMBB services and URLLC services.

In this embodiment, a single DCI is used to schedule both eMBB services and URLLC services. FIG. 7 (e.g., 1100-4, 1102-4, 1200-4, 1202-4) provides an exemplary illustration of this embodiment.

As shown in FIG. 7, a single DCI is used to schedule both eMBB and URLLC services. One DCI can be used to schedule multiple TBs from different TRPs. As throughput is demanded by the eMBB service, it is possible to use TB1 and TB3 with higher throughput (e.g., higher code rate) to schedule the eMBB services. For URLLC services, since reliably is important, the same DCI can schedule TB2 (the same copy or different redundancy versions) carrying URLLC package from both TRP1 and TRP2 with lower code rate (e.g., involves a number of repetitions). Therefore, two independent paths are created to improve the reliabilities of the URLLC package while offering eMBB services at the same without interruption.

Notice it is not necessary to always use the same number of layers for both TRPs. The scheduling decision depends on the traffic situation, and therefore in FIG. 7, TB3 (PDSCH3) is marked as optional.

This embodiment requires a new DCI format, which does not exist in the Rel-16 spec today, to be defined. This new DCI format needs to schedule multiple TBs from different TRPs. The new DCI format can indicate different TB sizes for different TBs and whether a TB should be sent by one TRP (and which TRP) or multiple TRPs (and which TRPs). However, some parameters (e.g., time/frequency resource allocation, etc.) for the different TBs can be kept the same to help reduce the size of the new DCI.

Embodiment 4

Some of the embodiments disclosed herein may be modified by using a single TRP, for example TRP1 and TRP2 are the same. This may be done by signaling the same TCI state for different PDSCHs. Either a single DCI or multiple DCIs may be used. In case different DCIs are used, the different DCIs may be carried by different PDCCHs associated with different CORESETs.

Embodiment 5 (e.g., 1100, 1102, 1200, 1202, 1300, 1302, 1400, 1402)

The single DCI (single PDCCH) based multi-TRP scheme in NR Rel-16 involves a single DCI indicating two TCI states via the TCI field that corresponds to transmission from two TRPs or two panels. The single DCI based multi-TRP scheme can be used to schedule PDSCH(s) in the following ways:

Different sets of layers of the same PDSCH transmitted from different TRPs. In this case, different sets of DM-RS ports are transmitted from the different TRPs to accompany PDSCH scheduling. A single TB is transmitted for up to 4 layers and two TBs are transmitted for up to 8 layers. The transmissions from the different TRPs are spatially multiplexed such that the different sets of layers transmitted from the different TRPs overlap in the same time-frequency resources. This mode is known as single PDCCH based non-coherent joint transmission (NC-JT).

The transmission from the multiple TRPs schedule one of the URLLC schemes defined in NR Rel-16 as described above in Embodiment 2. In this case, depending on the scheme used, the transmission from different TRPs are either frequency multiplexed (e.g., if FDMSchemeA or FDMSchemeB is used) or time multiplexed (e.g., if TDMSchemeA or TDMSchemeB is used). In this case, a single TB is transmitted, and the number of layers is 1 or 2 depending on UE capability.

Figure 8:
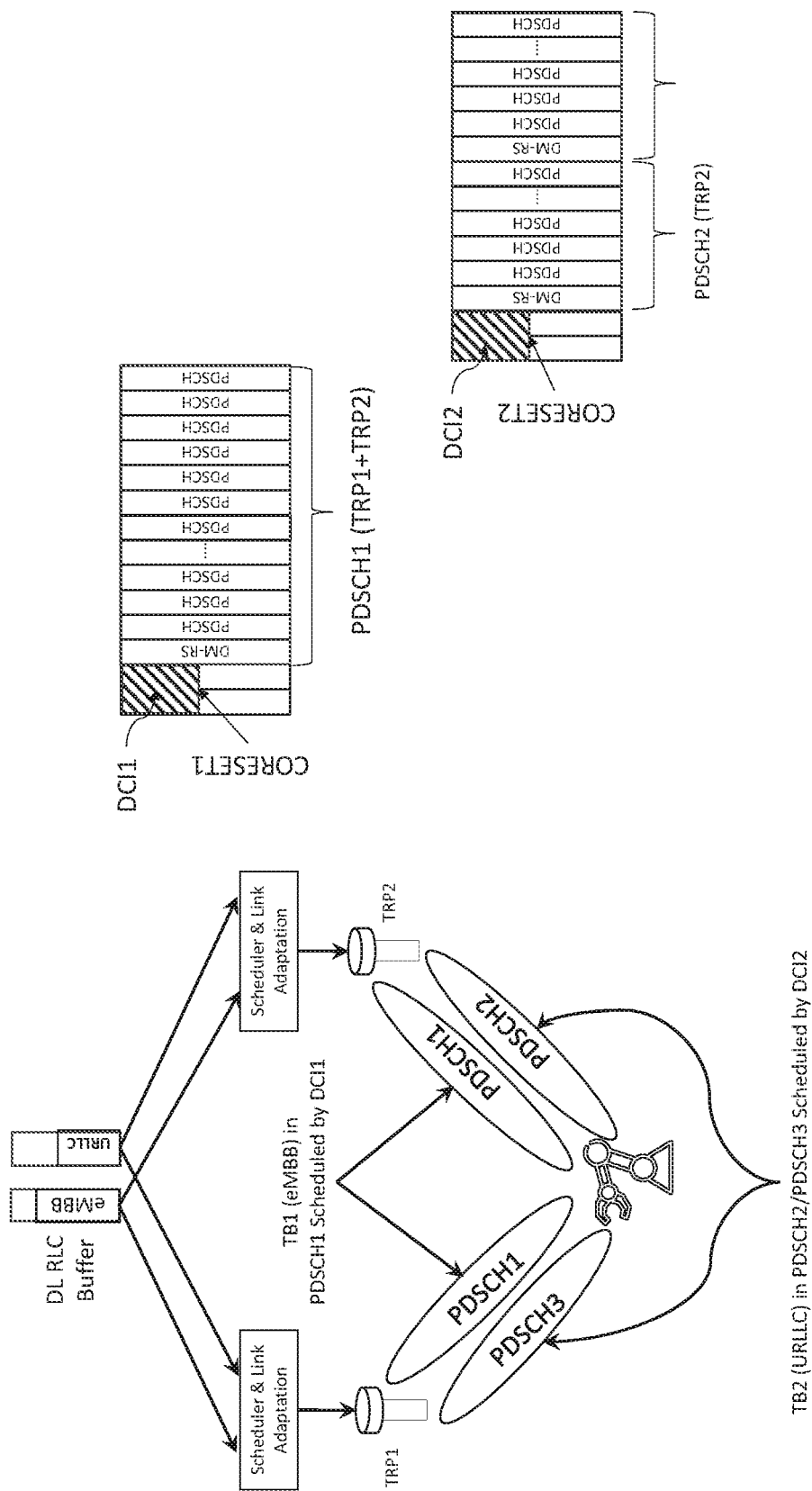
FIG. 8 is a schematic diagram wherein eMBB data is transmitted using single Physical Downlink Control Channel (PDCCH) based Non-Coherent Joint Transmission (NC-JT) scheduling while URLLC data is scheduled using one of the URLLC schemes defined in NR Rel-16.

In this embodiment, to achieve a balance between the eMBB throughput and the URLLC reliability, eMBB data are transmitted using single PDCCH based NC-JT scheduling while URLLC data are scheduled using one of the URLLC schemes defined in NR Rel-16. FIG. 8 (e.g., 1100-5, 1102-5, 1200-5, 1202-5) provides an exemplary implementation of the embodiment.

As illustrated in FIG. 8, DCI 1 is used to schedule eMBB data from both TRP1 and TRP2, and DCI2 is used to schedule URLLC from both TRP1 and TRP2. By scheduling the eMBB data using the single PDCCH based NC-JT scheme, it is possible to schedule up to eight layers from two TRPs (e.g., by indicating 2 TCI states via the TCI field in DCI), thus helping to increase peak data rate for eMBB. The number of TBs transmitted for eMBB data in PDSCH1 can be either 1 (if number of layers<=4) or 2 (if number of layers>4). To ensure reliability of URLLC data scheduling, DCI2 will schedule either a single PDSCH (e.g., FDMSchemeA) or multiple PDSCHs (e.g., FDM Scheme B, TDM Scheme A, or slot-based repetition scheme) over two TRPs. For the URLLC multi-TRP transmission scheduled by DCI2, the number of layers is limited to one, but can be two depending on UE capability.

Similar to Embodiment 2, one advantage of this embodiment is that the DCI used to schedule different services are independent, which means more robust DCI (e.g., different DCI formats or lower code rate or higher aggregation levels) can be used for the scheduling of URLLC services. In addition, this embodiment may also improve data rate for eMBB data, particularly in cases where the channel between the UE and the TRPs are rank deficient (e.g., line of sight (LOS) conditions). In this case, by transmitting different set of layers from different TRPs, the overall throughput of eMBB can be improved.

Note that even though the example in FIG. 8 shows that PDSCHs 1, 2, and 3 are non-overlapping in time-domain, the embodiment remains applicable when PDSCHs 1, 2, and 3 are partially or fully overlapping in time-domain. For instance, if CORESETs 1 and 2 shown in FIG. 8 are configured with different CORESET Pool Indices, then PDSCH1 can be fully or partially overlapping with one or both of PDSCH2 and PDSCH3.

FIG. 9 is a flowchart of an exemplary method performed by a base station for scheduling mixed type traffics via multiple TRPs. The method includes scheduling (900) a first of the multiple TRPs to transmit a mixture of a first type traffic (e.g., eMMB) corresponding to a first set of QoS requirements (e.g., higher throughput, moderate latency, and moderate reliability) and a second type traffic (e.g., URLLC) corresponding to a second set of QoS requirements (e.g., lower latency, higher reliability, and lower throughput) different from the first set of QoS requirements. The method also includes scheduling (902) a second of the multiple TRPs to transmit at least the second type traffic.

FIG. 10 is a flowchart of an exemplary method performed by a wireless device for receiving mixed type traffics via multiple TRPs. The method includes receiving (1000) from a first of the multiple TRPs a mixture of a first type traffic (e.g., eMMB) corresponding to a first set of QoS requirements (e.g., higher throughput, moderate latency, and moderate reliability) and a second type traffic (e.g., URLLC) corresponding to a second set of QoS requirements (e.g., lower latency, higher reliability, and lower throughput) different from the first set of QoS requirements. The method also includes receiving (1002) from a second of the multiple TRPs at least the second type traffic.

Figure 11:
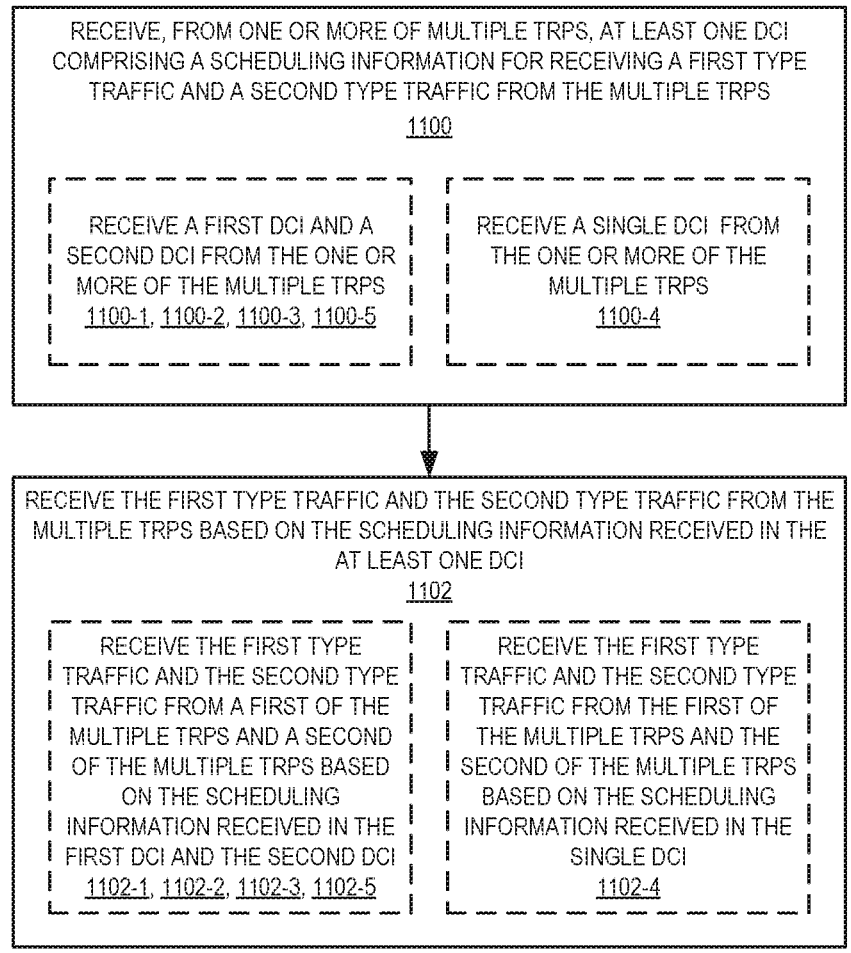
FIG. 11 is a flowchart of an exemplary method performed by a wireless device for receiving mixed type traffics via multiple TRPs based on a scheduling information received in one or more DCIs.

FIG. 11 is a flowchart of an exemplary method performed by a wireless device for receiving mixed type traffics via multiple TRPs based on a scheduling information received in one or more DCIs. The wireless device is configured to receive, from one or more of multiple TRPs, at least one DCI comprising a scheduling information for receiving a first type traffic and a second type traffic from the multiple TRPs (step 1100). Specifically, the wireless device may receive a first DCI and a second DCI from the one or more of the multiple TRPs (steps 1100-1, 1100-2, 1100-3, 1100-5). Alternatively, the wireless device may receive a single DCI from the one or more of the multiple TRPs (step 1100-4).

Accordingly, the wireless device is configured to receive the first type traffic and the second type traffic from the multiple TRPs based on the scheduling information received in the at least one DCI (step 1102). Specifically, the wireless device may receive the first type traffic and the second type traffic from a first of the multiple TRPs and a second of the multiple TRPs based on the scheduling information received in the first DCI and the second DCI (steps 1102-1, 1102-2, 1102-3, 1102-5). Alternatively, the wireless device may receive the first type traffic and the second type traffic from the first of the multiple TRPs and the second of the multiple TRPs based on the scheduling information received in the single DCI (step 1102-4).

Figure 12:
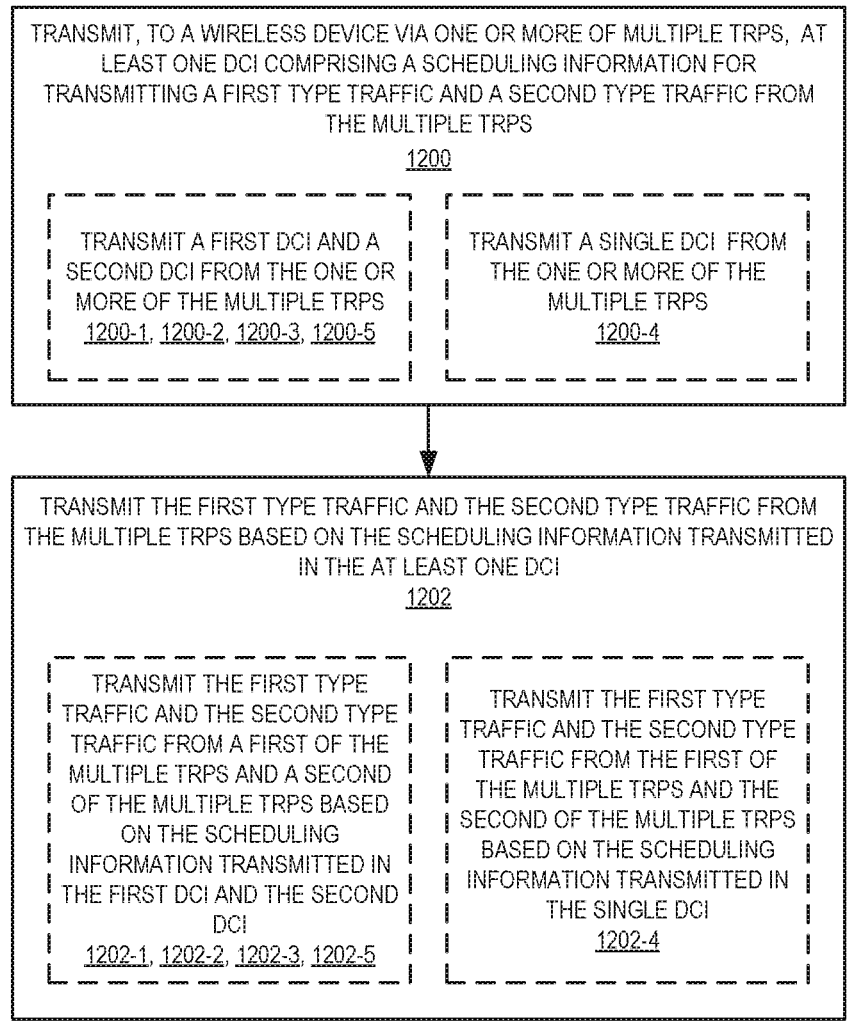
FIG. 12 is a flowchart of an exemplary method performed by a base station for transmitting mixed type traffics via the multiple TRPs based on the scheduling information provided in the one or more DCIs.

FIG. 12 is a flowchart of an exemplary method performed by a base station for transmitting mixed type traffics via the multiple TRPs based on the scheduling information provided in the one or more DCIs. The base station is configured to transmit, to a wireless device via one or more of multiple TRPs, at least one DCI comprising a scheduling information for transmitting a first type traffic and a second type traffic from the multiple TRPs (step 1200). Specifically, the base station may transmit a first DCI and a second DCI from the one or more of the multiple TRPs (steps 1200-1, 1200-2, 1200-3, 1200-5). Alternatively, the base station may transmit a single DCI from the one or more of the multiple TRPs (step 1200-4).

Accordingly, the base station can transmit the first type traffic and the second type traffic from the multiple TRPs based on the scheduling information transmitted in the at least one DCI (step 1202). Specifically, the base station may transmit the first type traffic and the second type traffic from a first of the multiple TRPs and a second of the multiple TRPs based on the scheduling information transmitted in the first DCI and the second DCI (steps 1202-1, 1202-2, 1202-3, 1202-5). Alternatively, the base station may transmit the first type traffic and the second type traffic from the first of the multiple TRPs and the second of the multiple TRPs based on the scheduling information transmitted in the single DCI (step 1202-4).

Figure 13:
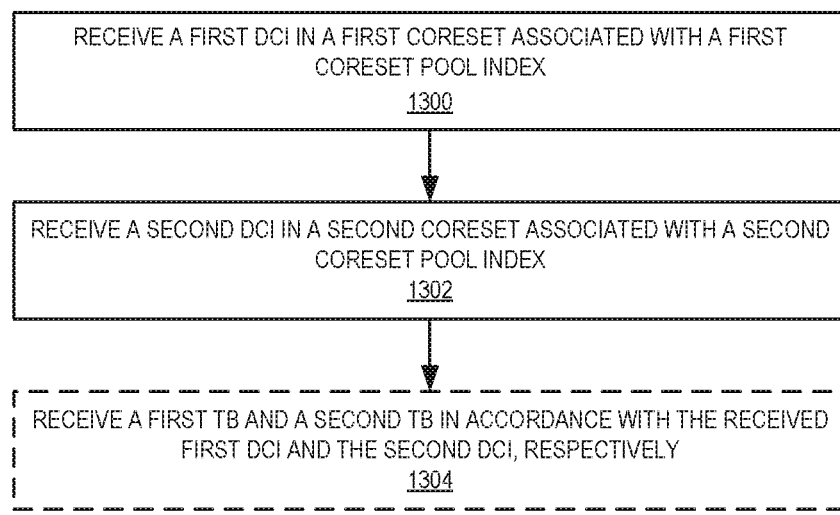
FIG. 13 is a flowchart of an exemplary method performed by a wireless device for receiving at least one DCI.

FIG. 13 is a flowchart of an exemplary method performed by a wireless device for receiving at least one DCI. The wireless device is configured to receive a first DCI in a first CORESET associated with a first CORESET Pool index (step 1300). The wireless device is also configured to receive a second DCI in a second CORESET associated with a second CORESET Pool index (step 1302). The first DCI comprises a scheduling information for receiving a first TB in a first PDSCH. The second DCI comprises a second scheduling information for receiving a second TB in one or more PDSCHs according to a configured reliability scheme. The wireless device may also receive the first TB and the second TB in accordance with the received first DCI and the second DCI (step 1304).

Figure 14:
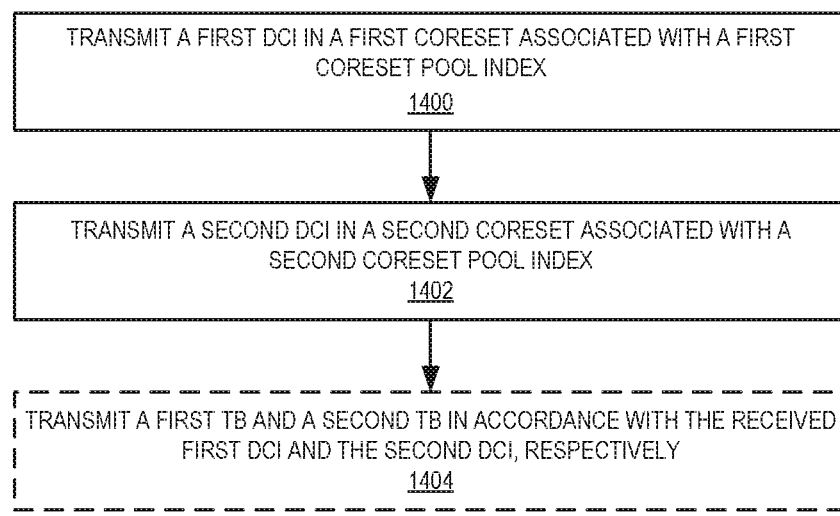
FIG. 14 is a flowchart of an exemplary method performed by a base station for transmitting at least one DCI.

FIG. 14 is a flowchart of an exemplary method performed by a base station for transmitting at least one DCI. The base station is configured to transmit a first DCI in a first CORESET associated with a first CORESET Pool index (step 1400). The base station is also configured to transmit a second DCI in a second CORESET associated with a second CORESET Pool index (step 1402). The first DCI comprises a scheduling information for receiving a first TB in a first PDSCH. The second DCI comprises a second scheduling information for receiving a second TB in one or more PDSCHs according to a configured reliability scheme. The base station may also transmit the first TB and the second TB in accordance with the received first DCI and the second DCI (step 1304).

Figure 15:
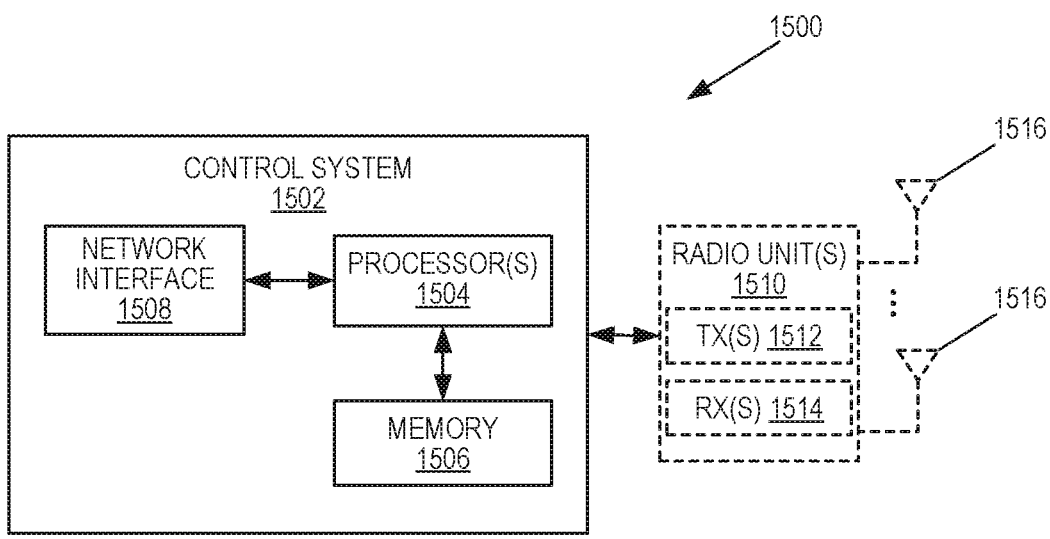
FIG. 15 is a schematic block diagram of a radio access node according to some embodiments of the present disclosure.

FIG. 15 is a schematic block diagram of a radio access node 1500 according to some embodiments of the present disclosure. Optional features are represented by dashed boxes. The radio access node 1500 may be, for example, a base station 302 or 306 or a network node that implements all or part of the functionality of the base station 302 or gNB described herein. As illustrated, the radio access node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the radio access node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a radio access node 1500 as described herein. In some embodiments, the function(s) are implemented in software that is stored, e.g., in the memory 1506 and executed by the one or more processors 1504.

Figure 16:
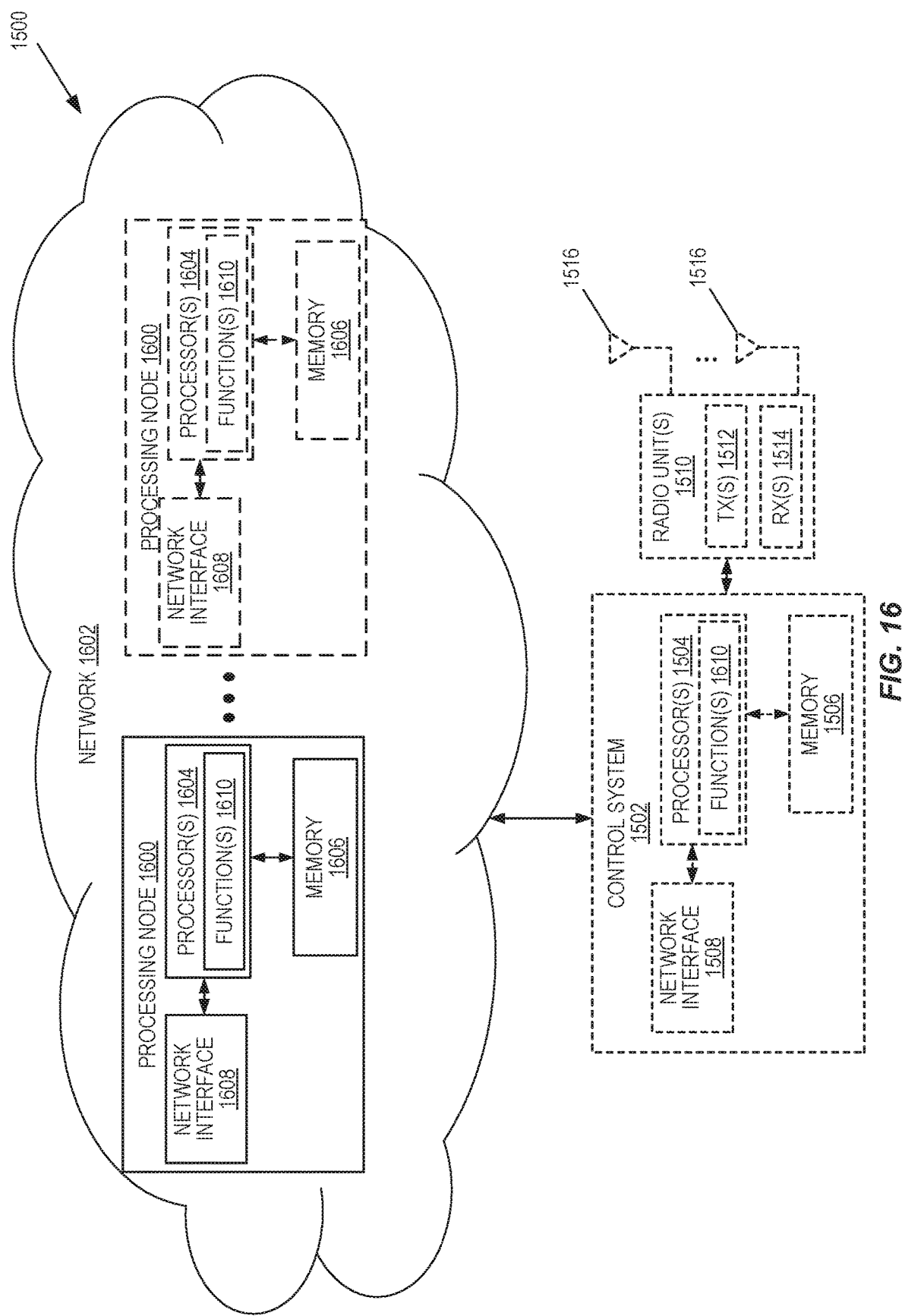
FIG. 16 is a schematic block diagram that illustrates a virtualized embodiment of the radio access node according to some embodiments of the present disclosure.

FIG. 16 is a schematic block diagram that illustrates a virtualized embodiment of the radio access node 1500 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1500 in which at least a portion of the functionality of the radio access node 1500 is implemented as a virtual component(s) (e.g., via a virtual machine(s) executing on a physical processing node(s) in a network(s)). As illustrated, in this example, the radio access node 1500 may include the control system 1502 and/or the one or more radio units 1510, as described above. The control system 1502 may be connected to the radio unit(s) 1510 via, for example, an optical cable or the like. The radio access node 1500 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICs, FPGAs, and/or the like), memory 1606, and a network interface 1608.

In this example, functions 1610 of the radio access node 1500 described herein are implemented at the one or more processing nodes 1600 or distributed across the one or more processing nodes 1600 and the control system 1502 and/or the radio unit(s) 1510 in any desired manner. In some particular embodiments, some or all of the functions 1610 of the radio access node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of radio access node 1500 or a node (e.g., a processing node 1600) implementing one or more of the functions 1610 of the radio access node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
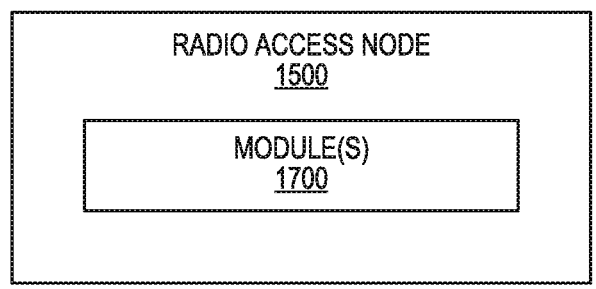
FIG. 17 is a schematic block diagram of the radio access node according to some other embodiments of the present disclosure.

FIG. 17 is a schematic block diagram of the radio access node 1500 according to some other embodiments of the present disclosure. The radio access node 1500 includes one or more modules 1700, each of which is implemented in software. The module(s) 1700 provide the functionality of the radio access node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
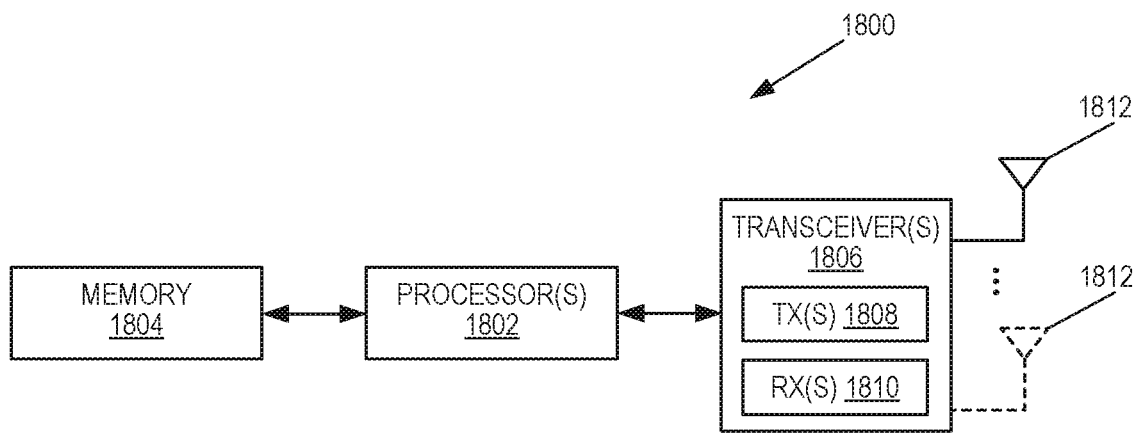
FIG. 18 is a schematic block diagram of a wireless communication device according to some embodiments of the present disclosure.

FIG. 18 is a schematic block diagram of a wireless communication device 1800 according to some embodiments of the present disclosure. As illustrated, the wireless communication device 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the wireless communication device 1800 described above may be fully or partially implemented in software that is, e.g., stored in the memory 1804 and executed by the processor(s) 1802. Note that the wireless communication device 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the wireless communication device 1800 and/or allowing output of information from the wireless communication device 1800), a power supply (e.g., a battery and associated power circuitry), etc.

In some embodiments, a computer program including instructions which, when executed by at least one processor, causes the at least one processor to carry out the functionality of the wireless communication device 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
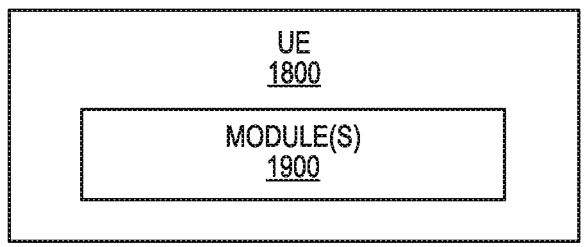
FIG. 19 is a schematic block diagram of the wireless communication device according to some other embodiments of the present disclosure.

FIG. 19 is a schematic block diagram of the wireless communication device 1800 according to some other embodiments of the present disclosure. The wireless communication device 1800 includes one or more modules 1900, each of which is implemented in software. The module(s) 1900 provide the functionality of the wireless communication device 1800 described herein.

Figure 20:
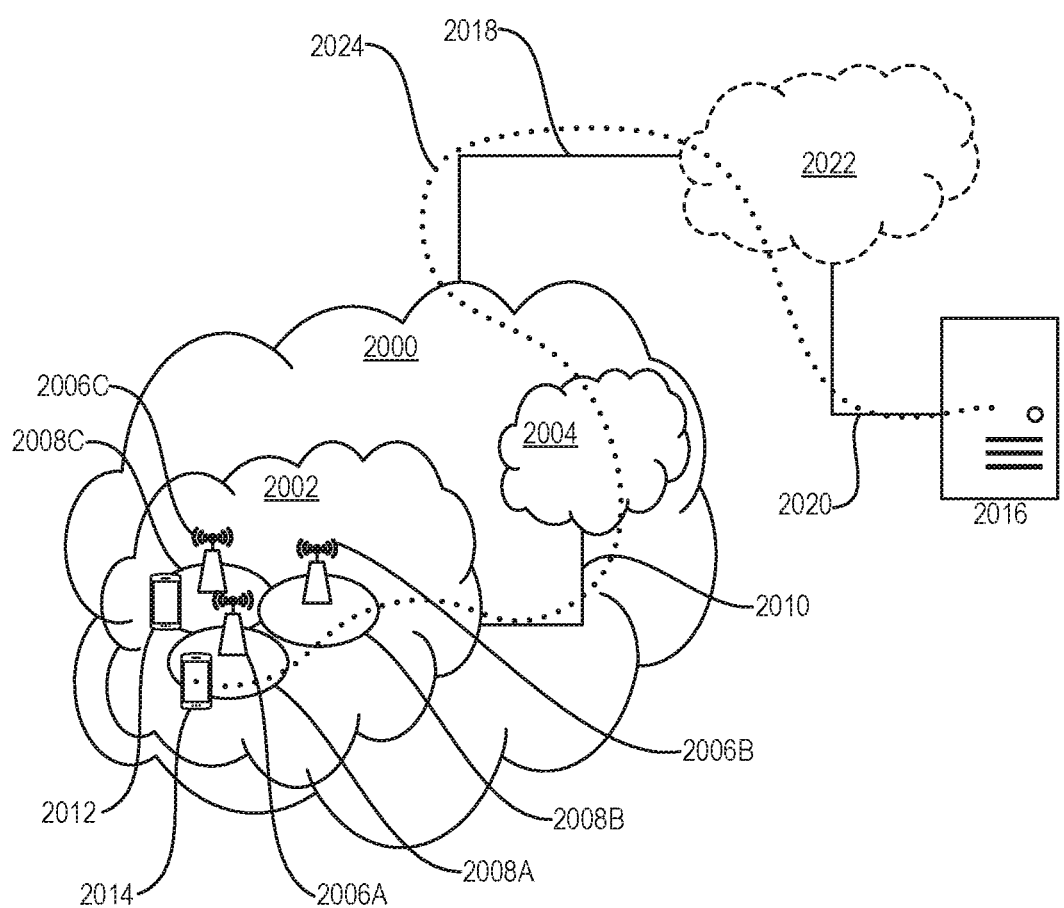
FIG. 20 is a schematic block diagram of a communication system including a telecommunication network in accordance with an embodiment of the present disclosure.

With reference to FIG. 20, in accordance with an embodiment, a communication system includes a telecommunication network 2000, such as a 3GPP-type cellular network, which comprises an access network 2002, such as a RAN, and a core network 2004. The access network 2002 comprises a plurality of base stations 2006A, 2006B, 2006C, such as Node Bs, eNBs, gNBs, or other types of wireless Access Points (APs), each defining a corresponding coverage area 2008A, 2008B, 2008C. Each base station 2006A, 2006B, 2006C is connectable to the core network 2004 over a wired or wireless connection 2010. A first UE 2012 located in coverage area 2008C is configured to wirelessly connect to, or be paged by, the corresponding base station 2006C. A second UE 2014 in coverage area 2008A is wirelessly connectable to the corresponding base station 2006A. While a plurality of UEs 2012, 2014 are illustrated in this example, the disclosed embodiments are equally applicable to a situation where a sole UE is in the coverage area or where a sole UE is connecting to the corresponding base station 2006.

The telecommunication network 2000 is itself connected to a host computer 2016, which may be embodied in the hardware and/or software of a standalone server, a cloud-implemented server, a distributed server, or as processing resources in a server farm. The host computer 2016 may be under the ownership or control of a service provider, or may be operated by the service provider or on behalf of the service provider. Connections 2018 and 2020 between the telecommunication network 2000 and the host computer 2016 may extend directly from the core network 2004 to the host computer 2016 or may go via an optional intermediate network 2022. The intermediate network 2022 may be one of, or a combination of more than one of, a public, private, or hosted network; the intermediate network 2022, if any, may be a backbone network or the Internet; in particular, the intermediate network 2022 may comprise two or more sub-networks (not shown).

The communication system of FIG. 20 as a whole enables connectivity between the connected UEs 2012, 2014 and the host computer 2016. The connectivity may be described as an Over-the-Top (OTT) connection 2024. The host computer 2016 and the connected UEs 2012, 2014 are configured to communicate data and/or signaling via the OTT connection 2024, using the access network 2002, the core network 2004, any intermediate network 2022, and possible further infrastructure (not shown) as intermediaries. The OTT connection 2024 may be transparent in the sense that the participating communication devices through which the OTT connection 2024 passes are unaware of routing of uplink and downlink communications. For example, the base station 2006 may not or need not be informed about the past routing of an incoming downlink communication with data originating from the host computer 2016 to be forwarded (e.g., handed over) to a connected UE 2012. Similarly, the base station 2006 need not be aware of the future routing of an outgoing uplink communication originating from the UE 2012 towards the host computer 2016.

Example implementations, in accordance with an embodiment, of the UE, base station, and host computer discussed in the preceding paragraphs will now be described with reference to FIG. 21. In a communication system 2100, a host computer 2102 comprises hardware 2104 including a communication interface 2106 configured to set up and maintain a wired or wireless connection with an interface of a different communication device of the communication system 2100. The host computer 2102 further comprises processing circuitry 2108, which may have storage and/or processing capabilities. In particular, the processing circuitry 2108 may comprise one or more programmable processors, ASICs, FPGAs, or combinations of these (not shown) adapted to execute instructions. The host computer 2102 further comprises software 2110, which is stored in or accessible by the host computer 2102 and executable by the processing circuitry 2108. The software 2110 includes a host application 2112. The host application 2112 may be operable to provide a service to a remote user, such as a UE 2114 connecting via an OTT connection 2116 terminating at the UE 2114 and the host computer 2102. In providing the service to the remote user, the host application 2112 may provide user data which is transmitted using the OTT connection 2116.

The communication system 2100 further includes a base station 2118 provided in a telecommunication system and comprising hardware 2120 enabling it to communicate with the host computer 2102 and with the UE 2114. The hardware 2120 may include a communication interface 2122 for setting up and maintaining a wired or wireless connection with an interface of a different communication device of the communication system 2100, as well as a radio interface 2124 for setting up and maintaining at least a wireless connection 2126 with the UE 2114 located in a coverage area (not shown in FIG. 21) served by the base station 2118. The communication interface 2122 may be configured to facilitate a connection 2128 to the host computer 2102. The connection 2128 may be direct or it may pass through a core network (not shown in FIG. 21) of the telecommunication system and/or through one or more intermediate networks outside the telecommunication system. In the embodiment shown, the hardware 2120 of the base station 2118 further includes processing circuitry 2130, which may comprise one or more programmable processors, ASICs, FPGAs, or combinations of these (not shown) adapted to execute instructions. The base station 2118 further has software 2132 stored internally or accessible via an external connection.

The communication system 2100 further includes the UE 2114 already referred to. The UE's 2114 hardware 2134 may include a radio interface 2136 configured to set up and maintain a wireless connection 2126 with a base station serving a coverage area in which the UE 2114 is currently located. The hardware 2134 of the UE 2114 further includes processing circuitry 2138, which may comprise one or more programmable processors, ASICs, FPGAs, or combinations of these (not shown) adapted to execute instructions. The UE 2114 further comprises software 2140, which is stored in or accessible by the UE 2114 and executable by the processing circuitry 2138. The software 2140 includes a client application 2142. The client application 2142 may be operable to provide a service to a human or non-human user via the UE 2114, with the support of the host computer 2102. In the host computer 2102, the executing host application 2112 may communicate with the executing client application 2142 via the OTT connection 2116 terminating at the UE 2114 and the host computer 2102. In providing the service to the user, the client application 2142 may receive request data from the host application 2112 and provide user data in response to the request data. The OTT connection 2116 may transfer both the request data and the user data. The client application 2142 may interact with the user to generate the user data that it provides.

Figure 21:
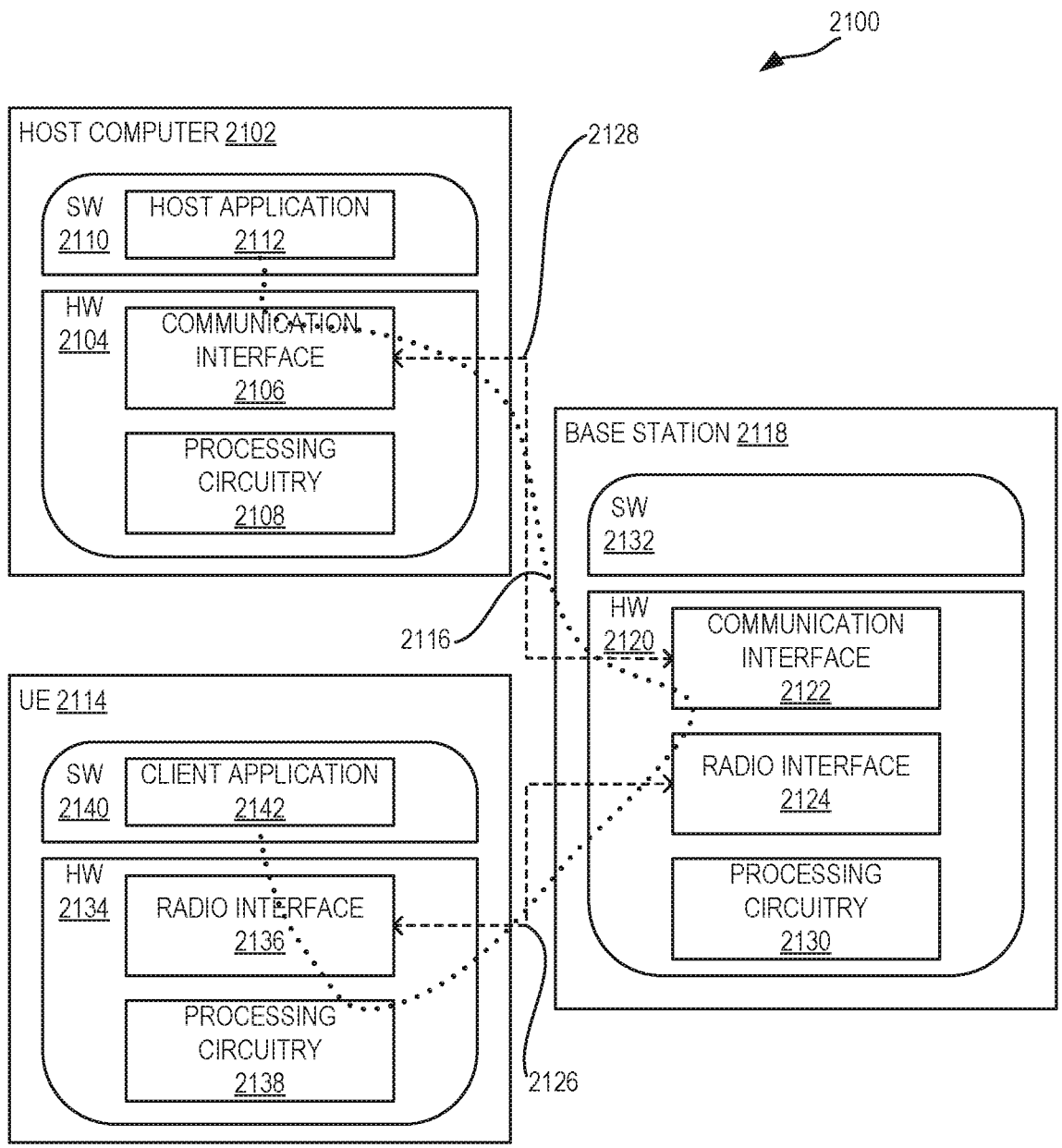
FIG. 21 is a schematic block diagram of a communication system including a telecommunication network in accordance with an embodiment of the present disclosure.

It is noted that the host computer 2102, the base station 2118, and the UE 2114 illustrated in FIG. 21 may be similar or identical to the host computer 1816, one of the base stations 2006A, 2006B, 2006C, and one of the UEs 2012, 2014 of FIG. 20, respectively. This is to say, the inner workings of these entities may be as shown in FIG. 21 and independently, the surrounding network topology may be that of FIG. 20.

In FIG. 21, the OTT connection 2116 has been drawn abstractly to illustrate the communication between the host computer 2102 and the UE 2114 via the base station 2118 without explicit reference to any intermediary devices and the precise routing of messages via these devices. The network infrastructure may determine the routing, which may be configured to hide from the UE 2114 or from the service provider operating the host computer 2102, or both. While the OTT connection 2116 is active, the network infrastructure may further take decisions by which it dynamically changes the routing (e.g., on the basis of load balancing consideration or reconfiguration of the network).

The wireless connection 2126 between the UE 2114 and the base station 2118 is in accordance with the teachings of the embodiments described throughout this disclosure. One or more of the various embodiments improve the performance of OTT services provided to the UE 2114 using the OTT connection 2116, in which the wireless connection 2126 forms the last segment. More precisely, the teachings of these embodiments may improve service reliability and spatial efficiency and thereby provide benefits such as reducing packet error rate (PER) without compromising throughput and spatial efficiency.

A measurement procedure may be provided for the purpose of monitoring data rate, latency, and other factors on which the one or more embodiments improve. There may further be an optional network functionality for reconfiguring the OTT connection 2116 between the host computer 2102 and the UE 2114, in response to variations in the measurement results. The measurement procedure and/or the network functionality for reconfiguring the OTT connection 2116 may be implemented in the software 2110 and the hardware 2104 of the host computer 2102 or in the software 2140 and the hardware 2134 of the UE 2114, or both. In some embodiments, sensors (not shown) may be deployed in or in association with communication devices through which the OTT connection 2116 passes; the sensors may participate in the measurement procedure by supplying values of the monitored quantities exemplified above, or supplying values of other physical quantities from which the software 2110, 2140 may compute or estimate the monitored quantities. The reconfiguring of the OTT connection 2116 may include message format, retransmission settings, preferred routing, etc.; the reconfiguring need not affect the base station 2118, and it may be unknown or imperceptible to the base station 2118. Such procedures and functionalities may be known and practiced in the art. In certain embodiments, measurements may involve proprietary UE signaling facilitating the host computer 2102's measurements of throughput, propagation times, latency, and the like. The measurements may be implemented in that the software 2110 and 2140 causes messages to be transmitted, in particular empty or 'dummy' messages, using the OTT connection 2116 while it monitors propagation times, errors, etc.

Figures 22, 23:
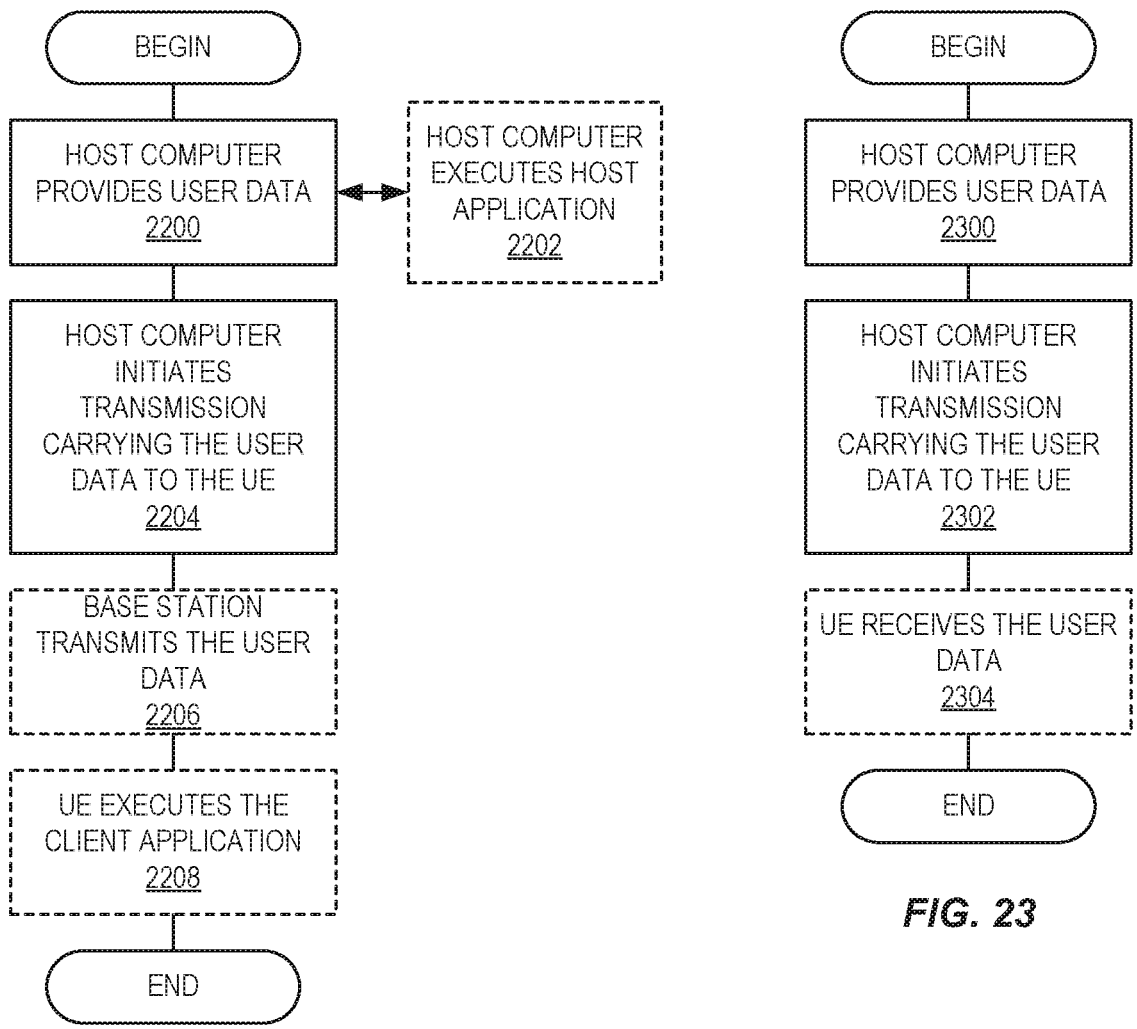
FIG. 22 is a flowchart illustrating a method implemented in a communication system in accordance with one embodiment of the present disclosure.
FIG. 23 is a flowchart illustrating a method implemented in a communication system in accordance with one embodiment of the present disclosure.

FIG. 22 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 22 will be included in this section. In step 2200, the host computer provides user data. In sub-step 2202 (which may be optional) of step 2200, the host computer provides the user data by executing a host application. In step 2204, the host computer initiates a transmission carrying the user data to the UE. In step 2206 (which may be optional), the base station transmits to the UE the user data which was carried in the transmission that the host computer initiated, in accordance with the teachings of the embodiments described throughout this disclosure. In step 2208 (which may also be optional), the UE executes a client application associated with the host application executed by the host computer.

FIG. 23 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 23 will be included in this section. In step 2300 of the method, the host computer provides user data. In an optional sub-step (not shown) the host computer provides the user data by executing a host application. In step 2302, the host computer initiates a transmission carrying the user data to the UE. The transmission may pass via the base station, in accordance with the teachings of the embodiments described throughout this disclosure. In step 2304 (which may be optional), the UE receives the user data carried in the transmission.

FIG. 24 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 24 will be included in this section. In step 2400 (which may be optional), the UE receives input data provided by the host computer. Additionally or alternatively, in step 2402, the UE provides user data. In sub-step 2404 (which may be optional) of step 2400, the UE provides the user data by executing a client application. In sub-step 2406 (which may be optional) of step 2402, the UE executes a client application which provides the user data in reaction to the received input data provided by the host computer. In providing the user data, the executed client application may further consider user input received from the user. Regardless of the specific manner in which the user data was provided, the UE initiates, in sub-step 2408 (which may be optional), transmission of the user data to the host computer. In step 2410 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 25 will be included in this section. In step 2500 (which may be optional), in accordance with the teachings of the embodiments described throughout this disclosure, the base station receives user data from the UE. In step 2502 (which may be optional), the base station initiates transmission of the received user data to the host computer. In step 2504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for receiving mixed type traffics via multiple TRPs, the method comprising:

receiving (1000) from a first of the multiple TRPs a mixture of a first type traffic (e.g., eMMB) corresponding to a first set of QoS requirements (e.g., higher throughput, moderate latency, and moderate reliability) and a second type traffic (e.g., URLLC) corresponding to a second set of QoS requirements (e.g., lower latency, higher reliability, and lower throughput) different from the first set of QoS requirements; and receiving (1002) from a second of the multiple TRPs at least the second type traffic.

Embodiment 2: Wherein, receiving (1000) the mixture of the first type of traffic and the second type of traffic comprises receiving the first type traffic and the second type traffic multiplexed in a first TB(s); receiving (1002) the at least the second type traffic comprises receiving the second type traffic encoded in a second TB(s); and wherein the first TB(s) and the second TB(s) are received in PDSCH resources that are wholly or partially overlapping in time domain (e.g., received concurrently).

Embodiment 3: Wherein, receiving (1000) the mixture of the first type of traffic and the second type of traffic comprises receiving the first type traffic and the second type traffic multiplexed in a first TB(s); receiving (1002) the at least the second type traffic comprises receiving the second type traffic encoded in a second TB(s); and wherein the first TB(s) and the second TB(s) are received in PDSCH resources that are non-overlapping in the time domain (e.g., received sequentially).

Embodiment 4: Wherein, receiving (1000) the mixture of the first type of traffic and the second type of traffic comprises receiving the first type traffic and the second type traffic multiplexed in a first TB(s); receiving (1002) the at least the second type traffic comprises receiving the second type traffic encoded in a second TB(s); the first TB(s) and the second TB(s) are received from the first of the multiple TRPs; and the second TB(s) is received from the second of the multiple TRPs.

Embodiment 5: Wherein, receiving (1000) the mixture of the first type of traffic and the second type of traffic comprises receiving the first type traffic and the second type traffic multiplexed in a first TB(s); receiving (1002) the at least the second type traffic comprises receiving the first type traffic and the second type traffic multiplexed in a second TB(s); and the first TB(s) and the second TB(s) are received from the first of the multiple TRPs and the second of the multiple TRPs, respectively.

Embodiment 6: Wherein, receiving (1000) the mixture of the first type of traffic and the second type of traffic comprises receiving the first type traffic encoded in a first TB(s); receiving (1002) the at least the second type traffic comprises receiving the second type traffic encoded in a second TB(s); the first TB(s) are received in a first PDSCH corresponding to the first of the multiple TRPs; and the second TB(s) are received in a second PDSCH corresponding to the first of the multiple TRPs and the second of the multiple TRPs.

Embodiment 7: The first TB(s) are received in a third PDSCH corresponding to the second of the multiple TRPs.

Embodiment 8: The method further includes: receiving (1000) the mixture of the first type of traffic and the second type of traffic comprises receiving the first type traffic encoded in a first TB(s); receiving (1002) the at least the second type traffic comprises receiving the second type traffic encoded in a second TB(s) and a third TB(s); the first TB(s) is received in a first PDSCH corresponding to the first of the multiple TRPs and the second of the multiple TRPs; and the second TB(s) is received in a second PDSCH corresponding to the first of the multiple TRPs and the second of the multiple TRPs.

Embodiment 9: The second type traffic encoded in the first TB(s) and the second type traffic encoded in the second TB(s) correspond to at least one data packet of the second type traffic.

Embodiment 10: The method also includes providing user data; and forwarding the user data to a host computer via the transmission to the base station.

Embodiment 11: A method performed by a base station for scheduling mixed type traffics via multiple TRPs, the method comprising:
scheduling (900) a first of the multiple TRPs to transmit a mixture of a first type traffic (e.g., eMMB) corresponding to a first set of QoS requirements (e.g., higher throughput, moderate latency, and moderate reliability) and a second type traffic (e.g., URLLC) corresponding to a second set of QoS requirements (e.g., lower latency, higher reliability, and lower throughput) different from the first set of QoS requirements; and
scheduling (902) a second of the multiple TRPs to transmit at least the second type traffic.

Embodiment 12: Wherein, scheduling (900) the first of the multiple TRPs to transmit the mixture of the first type traffic and the second traffic type comprises scheduling a first TB(s) in a first downlink control information (DCI) carried in a first control resource set (CORESET) corresponding to the first of the multiple TRPs, the first type traffic and the second type traffic being multiplexed in the first TB(s); and scheduling (902) the second of the multiple TRPs to transmit the at least the second type traffic comprises scheduling a second TB(s) in a second DCI carried in a second CORESET corresponding to second of the multiple TRPs, the second traffic type being encoded in the second TB.

Embodiment 13: The method also includes multiplexing the first type traffic and the second type traffic in the first TB(s); and encoding the second type traffic in the second TB(s).

Embodiment 14: The second type traffic encoded in the first TB(s) and the second type traffic encoded in the second TB(s) correspond to at least one data packet of the second type traffic.

Embodiment 15: The method also includes transmitting the first TB(s) and the second TB(s) in a wholly or partially overlapping time domain resource (e.g., transmit concurrently).

Embodiment 16: Wherein, scheduling (900) the first of the multiple TRPs to transmit the mixture of the first type traffic and the second traffic type comprises scheduling a first TB(s) in a first downlink control information (DCI) carried in a first CORESET corresponding to a respective one of the multiple TRPs; and scheduling (902) the second of the multiple TRPs to transmit the at least the second type traffic comprises scheduling a second TB(s) in a second DCI carried in a second CORESET corresponding to the respective one of the multiple TRPs.

Embodiment 17: The method also includes multiplexing the first type traffic and the second type traffic in the first TB(s); and encoding the second type traffic in the second TB(s).

Embodiment 18: The second type traffic encoded in the first TB(s) and the second type traffic encoded in the second TB(s) correspond to at least one data packet of the second type traffic.

Embodiment 19: The method also includes transmitting the first TB(s) and the second TB(s) in a non-overlapping time domain resource (e.g., transmit sequentially).

Embodiment 20: Wherein, scheduling (900) the first of the multiple TRPs to transmit the mixture of the first type traffic and the second traffic type comprises scheduling the first type traffic in a first TB(s) via a first DCI carried in a first CORESET corresponding to the first of the multiple TRPs; and scheduling (902) the second of the multiple TRPs to transmit the at least the second type traffic comprises scheduling the second type traffic in a second TB(s) via a second DCI carried in a second CORESET corresponding to the first of the multiple TRPs and the second of the multiple TRPs (e.g., based on FDMSchemeA, FDMSchemeB, TDMSchemeA, or TDMSchemeB).

Embodiment 21: The method also includes multiplexing the first type traffic and the second type traffic in the first TB(s); and encoding the second type traffic in a second TB(s).

Embodiment 22: The second type traffic encoded in the first TB(s) and the second type traffic encoded in the second TB(s) correspond to at least one data packet of the second type traffic.

Embodiment 23: The method also includes transmitting the first TB(s) and the second TB(s) from the first of the multiple TRPs; and transmitting the second TB(s) from the second of the multiple TRPs.

Embodiment 24: Wherein, scheduling (900) the first of the multiple TRPs to transmit the mixture of the first type traffic and the second traffic type comprises scheduling a first TB(s) in a first DCI carried in a first CORESET corresponding to the first of the multiple TRPs; scheduling (902) the second of the multiple TRPs to transmit the at least the second type traffic comprises scheduling a second TB(s) in a second DCI carried in a second CORESET corresponding to the second of the multiple TRPs.

Embodiment 25: The method also includes multiplexing the first type traffic and the second type traffic in the first TB(s); and multiplexing the first type traffic and the second type traffic in the second TB(s).

Embodiment 26: The second type traffic encoded in the first TB(s) and the second type traffic encoded in the second TB(s) correspond to at least one data packet of the second type traffic.

Embodiment 27: The method also includes transmitting the first TB(s) and the second TB(s) from the first of the multiple TRPs and the second of the multiple TRPs, respectively.

Embodiment 28: Wherein, scheduling (900) the first of the multiple TRPs to transmit the mixture of the first type traffic and the second traffic type and scheduling (902) the second of the multiple TRPs to transmit the at least the second type traffic comprise scheduling a first TB(s) and a second TB(s) in a DCI carried in a first CORESET associated with the first of the multiple TRPs.

Embodiment 29: The method also includes encoding the first type traffic in the first TB(s); and encoding the second type traffic in the second TB(s).

Embodiment 30: The method also includes transmitting the first TB(s) in a first PDSCH corresponding to the first of the multiple TRPs; and transmitting the second TB(s) in a second PDSCH corresponding to the first of the multiple TRPs and the second of the multiple TRPs.

Embodiment 31: The method also includes transmitting the first TB(s) in a third PDSCH corresponding to the second of the multiple TRPs.

Embodiment 32: Wherein, scheduling (900) to transmit the mixture of the first type traffic and the second traffic type comprises scheduling a first TB(s) in a first DCI carried in a first CORESET corresponding to the transmission from the first of the multiple TRPs and the transmission from the second of the multiple TRPs; scheduling (902) to transmit the at least the second type traffic comprises scheduling a second TB(s) in a second DCI carried in a second CORESET corresponding to the transmission from the first of the multiple TRPs and the transmission from the second of the multiple TRPs.

Embodiment 33: The method also includes transmitting the first TB(s) in a first PDSCH corresponding to the first of the multiple TRPs and the second of the multiple TRPs; and transmitting the second TB(s) in a second PDSCH corresponding to the first of the multiple TRPs and in a third PDSCH corresponding to the second of the multiple TRPs.

Embodiment 34: The method also includes encoding the first type traffic in a first TB(s); and encoding the second type traffic in a second TB(s).

Embodiment 35: The first of the multiple TRPs and the second of the multiple TRPs are a same TRP among the multiple TRPs.

Embodiment 36: The method also includes obtaining user data; and forwarding the user data to a host computer or a wireless device.

Embodiment 37: A wireless device for receiving mixed type traffics from multiple TRPs, the wireless device comprising: processing circuitry configured to perform any of the steps of any of the embodiments performed by the wireless device;
and power supply circuitry configured to supply power to the wireless device.

Embodiment 38: A base station for scheduling mixed type traffics via multiple TRPs, the base station comprising: processing circuitry configured to perform any of the steps of any of the embodiments performed by the base station; and power supply circuitry configured to supply power to the base station.

Embodiment 39: A User Equipment, UE, for receiving mixed type traffics via multiple TRPs, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the embodiments performed by the wireless device; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 40: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the embodiments performed by the base station.

Embodiment 41: The communication system further including the base station.

Embodiment 42: The communication system further including the UE, wherein the UE is configured to communicate with the base station.

Embodiment 43: The communication system, wherein: the processing circuitry of the host computer is configured to execute a host application, thereby providing the user data; and the UE comprises processing circuitry configured to execute a client application associated with the host application.

Embodiment 44: method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the embodiments performed by the base station.

Embodiment 45: The method also includes, at the base station, transmitting the user data.

Embodiment 46: The user data is provided at the host computer by executing a host application, the method further comprising, at the UE, executing a client application associated with the host application.

Embodiment 47: A User Equipment, UE, configured to communicate with a base station, the UE comprising a radio interface and processing circuitry configured to perform the method of the previous 3 embodiments.

Embodiment 48: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the embodiments performed by the wireless device.

Embodiment 49: The communication system, wherein the cellular network further includes a base station configured to communicate with the UE.

Embodiment 50: The communication system, wherein: the processing circuitry of the host computer is configured to execute a host application, thereby providing the user data; and the UE's processing circuitry is configured to execute a client application associated with the host application.

Embodiment 51: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the embodiments performed by the wireless device.

Embodiment 52: The method further comprising at the UE, receiving the user data from the base station.

Embodiment 53: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the embodiments performed by the wireless device.

Embodiment 54: The communication system, further including the base station, wherein the base station comprises a radio interface configured to communicate with the UE and a communication interface configured to forward to the host computer the user data carried by a transmission from the UE to the base station.

Embodiment 55: The communication system, wherein: the processing circuitry of the host computer is configured to execute a host application; and the UE's processing circuitry is configured to execute a client application associated with the host application, thereby providing the user data.

Embodiment 56: The communication system, wherein: the processing circuitry of the host computer is configured to execute a host application, thereby providing request data; and the UE's processing circuitry is configured to execute a client application associated with the host application, thereby providing the user data in response to the request data.

Embodiment 57: A method implemented in a communication system including a host computer, a base station, and a User Equipment, UE, the method comprising: at the host computer, receiving user data transmitted to the base station from the UE, wherein the UE performs any of the steps of any of the embodiments performed by the wireless device.

Embodiment 58: The method further comprising, at the UE, providing the user data to the base station.

Embodiment 59: The method further comprising: at the UE, executing a client application, thereby providing the user data to be transmitted; and at the host computer, executing a host application associated with the client application.

Embodiment 60: The method further comprising: at the UE, executing a client application; and at the UE, receiving input data to the client application, the input data being provided at the host computer by executing a host application associated with the client application; wherein the user data to be transmitted is provided by the client application in response to the input data.

Embodiment 61: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the embodiments performed by the base station.

Embodiment 62: The communication system further including the base station.

Embodiment 63: The communication system, further including the UE, wherein the UE is configured to communicate with the base station.

Embodiment 64: The communication system, wherein: the processing circuitry of the host computer is configured to execute a host application; and the UE is configured to execute a client application associated with the host application, thereby providing the user data to be received by the host computer.

Embodiment 65: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the embodiments performed by the wireless device.

Embodiment 66: The method further comprising, at the base station, receiving the user data from the UE.

Embodiment 67: The method further comprising, at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BLER Block Error Rate
BWP Bandwidth Part CORESET Control Resource Set
CPU Central Processing Unit
DCI Downlink Control Information
DN Data Network
DSP Digital Signal Processor
eMBB Enhanced Mobile Broadband
eMIMO enhanced Multiple Input Multiple Output
eNB Enhanced or Evolved Node B
EPS Evolved Packet System
E-UTRA Evolved Universal Terrestrial Radio Access
FDD Frequency Division Duplex
FPGA Field Programmable Gate Array
GBR Guaranteed Bit Rate
gNB New Radio Base Station
gNB-DU New Radio Base Station Distributed Unit
HARQ Hybrid Automatic Repeat Request
HSS Home Subscriber Server
IoT Internet of Things
IP Internet Protocol
LTE Long Term Evolution
MME Mobility Management Entity
MTC Machine Type Communication
NC-JT Non-Coherent Joint Transmission
NEF Network Exposure Function
NF Network Function
NR New Radio
NRF Network Function Repository Function
NSSF Network Slice Selection Function
OFDM Orthogonal Frequency Division Multiplexing
OTT Over-the-Top
PBCH Physical Broadcast Channel
PC Personal Computer
PCF Policy Control Function
PDB Packet Delay Budget
PDCCH Physical Downlink Control Channel
PDCP Packet Data Convergence Protocol
PDSCH Physical Downlink Shared Channel
PER Packet Error Rate
P-GW Packet Data Network Gateway
PRACH Physical Random Access Channel
PRB Physical Resource Block
PUCCH Physical Uplink Control Channel
PUSCH Physical Uplink Shared Channel
QoS Quality of Service
RAM Random Access Memory
RAN Radio Access Network
RAR Random Access Response
RB Resource Block
ROM Read Only Memory
RRH Remote Radio Head
RTT Round Trip Time
SCEF Service Capability Exposure Function
SDF Service Data Flows
SMF Session Management Function
TCI Transmission Configuration Indication
TDD Time Division Duplex
TRP Transmission/Reception Point
UDM Unified Data Management
UE User Equipment
URLLC Ultra-Reliable and Low Latency Communication
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for receiving mixed type traffics from a base station via multiple Transmission/Reception Points (TRPs), comprising:
   receiving, from one or more of the multiple TRPs, at least one Downlink Control Information (DCI) comprising a scheduling information for receiving a first type traffic and a different second type traffic from the multiple TRPs; and
   receiving the first type traffic and the different second type traffic from the multiple TRPs based on the scheduling information received in the at least one DCI.

2. The method of claim 1, wherein:
   the first type traffic corresponds to a first set of Quality-of-Service (Qos) requirements; and
   the different second type traffic corresponds to a second set of QoS requirements different from the first set of QoS requirements.

3. The method of claim 1, wherein:
   receiving the at least one DCI comprises receiving a single DCI from the one or more of the multiple TRPs, wherein the single DCI comprises the scheduling information for receiving each of the first type traffic and the different second type traffic from the first of the multiple TRPs and the second of the multiple TRPs; and
   receiving the first type traffic and the different second type traffic comprises receiving the first type traffic and the different second type traffic from the first of the multiple TRPs and the second of the multiple TRPs based on the scheduling information received in the single DCI.

4. The method of claim 3, wherein the single DCI further comprises the scheduling information for receiving from the first of the multiple TRPs via a first Transport Block (TB) in a first Physical Downlink Shared Channel (PDSCH) and the scheduling information for receiving from the first of the multiple TRPs and the second of the multiple TRPs via a second TB in a second PDSCH.

5. The method of claim 4, wherein the single DCI further comprises the scheduling information for receiving from the second of the multiple TRPs via a third TB in a third PDSCH.

6. The method of claim 1, wherein:
   receiving the at least one DCI comprises receiving a first DCI and a second DCI from the one or more of the multiple TRPs, wherein:
      the first DCI comprises the scheduling information for receiving the first type traffic from the first of the multiple TRPs via a first Physical Downlink Shared Channel (PDSCH); and
      the second DCI comprises the scheduling information for receiving the different second type traffic from the first of the multiple TRPs and the second of the multiple TRPs via a second PDSCH and/or a third PDSCH, respectively; and
   receiving the first type traffic and the different second type traffic comprises receiving the first type traffic and the different second type traffic from the first of the multiple TRPs and the second of the multiple TRPs based on the scheduling information received in the first DCI and the second DCI.

7. A wireless device, comprising:
   processing circuitry configured to cause the wireless device to:
      receive, from one or more of multiple Transmission/Reception Points (TRPs), at least one Downlink Control Information (DCI) comprising a scheduling information for receiving a first type traffic and a different second type traffic from the multiple TRPs; and receive the first type traffic and the different second type traffic from the multiple TRPs based on the scheduling information received in the at least one DCI;

and power supply circuitry configured to supply power to the wireless device.

8. A method performed by a base station for transmitting mixed type traffics to a wireless device via multiple Transmission/Reception Points (TRPs), comprising:

transmitting, to a wireless device via one or more of the multiple TRPs, at least one Downlink Control Information (DCI) comprising a scheduling information for transmitting a first type traffic and a different second type traffic from the multiple TRPs; and transmitting the first type traffic and the different second type traffic from the multiple TRPs based on the scheduling information transmitted in the at least one DCI.

9. The method of claim 8, wherein:

the first type traffic corresponds to a first set of Quality-of-Service (Qos) requirements; and the different second type traffic corresponds to a second set of QOS requirements different from the first set of QoS requirements.

10. The method of claim 8, wherein:

transmitting the at least one DCI comprises transmitting a single DCI from the one or more of the multiple TRPs, wherein the single DCI comprises the scheduling information for transmitting each of the first type traffic and the different second type traffic from the first of the multiple TRPs and the second of the multiple TRPs; and transmitting the first type traffic and the different second type traffic comprises transmitting the first type traffic and the different second type of traffic from the first of the multiple TRPs and the second of the multiple TRPs based on the scheduling information transmitted in the single DCI.

11. The method of claim 10, wherein the single DCI further comprises the scheduling information for transmitting from the first of the multiple TRPs via a first Transport Block (TB) in a first Physical Downlink Shared Channel (PDSCH) and the scheduling information for transmitting from the first of the multiple TRPs and the second of the multiple TRPs via a second TB in a second PDSCH.

12. The method of claim 11, wherein the single DCI further comprises the scheduling information for transmitting from the second of the multiple TRPs via a third TB in a third PDSCH.

13. The method of claim 8, wherein:

transmitting the at least one DCI comprises transmitting a first DCI and a second DCI from the one or more of the multiple TRPs, wherein:

the first DCI comprises the scheduling information for transmitting the first type traffic from the first of the multiple TRPs via a first Physical Downlink Shared Channel (PDSCH); and the second DCI comprises the scheduling information for transmitting the different second type traffic from the first of the multiple TRPs and the second of the multiple TRPs via a second PDSCH and a third PDSCH, respectively; and transmitting the first type traffic and the different second type traffic comprises transmitting the first type traffic and the different second type traffic from the first of the multiple TRPs and the second of the multiple TRPs based on the scheduling information transmitted in the first DCI and the second DCI.

14. A base station, comprising:

processing circuitry configured to cause the base station to:

transmit, to a wireless device via one or more of multiple Transmission/Reception Points (TRPs), at least one Downlink Control Information (DCI) comprising a scheduling information for transmitting a first type traffic and a different second type traffic from the multiple TRPs; and transmit the first type traffic and the different second type traffic from the multiple TRPs based on the scheduling information transmitted in the at least one DCI; and power supply circuitry configured to supply power to the base station.

* * * * *